US012553116B2

(12) United States Patent
Watanabe et al.

(10) Patent No.: US 12,553,116 B2
(45) **Date of Patent: *Feb. 17, 2026**

(54) AMORPHOUS ALLOY SOFT MAGNETIC POWDER, DUST CORE, MAGNETIC ELEMENT, AND ELECTRONIC DEVICE

(71) Applicant: SEIKO EPSON CORPORATION, Tokyo (JP)

(72) Inventors: Mayu Watanabe, Hachinohe (JP); Takuma Enomoto, Hachinohe (JP); Kai Kitamura, Hachinohe (JP); Junya Abe, Hachinohe (JP); Atsushi Nakamura, Hachinohe (JP); Masayuki Omoto, Chino (JP); Ichiro Asaoka, Fujimi (JP)

(73) Assignee: SEIKO EPSON CORPORATION (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/159,858

(22) Filed: Jan. 26, 2023

(65) Prior Publication Data

US 2023/0235436 A1 Jul. 27, 2023

(30) Foreign Application Priority Data

Jan. 27, 2022 (JP) ................................ 2022-010904

(51) Int. Cl.
*C22C 45/02* (2006.01)
*B22F 1/065* (2022.01)
(Continued)

(52) U.S. Cl.
CPC .............. *C22C 45/02* (2013.01); *B22F 1/065* (2022.01); *C22C 38/02* (2013.01); *H01F 1/1535* (2013.01); *C22C 2202/02* (2013.01)

(58) Field of Classification Search
CPC ................................ C22C 38/02; C22C 45/02
See application file for complete search history.

(56) References Cited

U.S. PATENT DOCUMENTS 11,984,245 B2 * 5/2024 Enomoto ............ H01F 1/15341
2010/0040503 A1 2/2010 Yoshizawa et al.
(Continued)

FOREIGN PATENT DOCUMENTS

JP 2004-063798 A 2/2004
JP 2004-111756 A 4/2004
(Continued)

OTHER PUBLICATIONS

Partiti et al. "Mossbauer analysis of the phase distribution of Fe64.5Co18B16SiC0.5 soft magnetic samples in powder form." J. Appl. Phys. 81, 4655-4657 (1997) (Year: 1997).*
(Continued)

*Primary Examiner* — Sally A Merkling
*Assistant Examiner* — Sean P. O'Keefe
(74) *Attorney, Agent, or Firm* — Harness, Dickey & Pierce, P.L.C.

(57) ABSTRACT

An amorphous alloy soft magnetic powder has a composition represented by $(Fe_xCo_{1-x})_{100-(a+b)}(Si_yB_{1-y})_aM_b$, where M is at least one selected from the group consisting of C, S, P, Sn, Mo, Cu, and Nb, and x, y, a, and b satisfy $0.73 \leq x \leq 0.85$, $0.02 \leq y \leq 0.10$, $13.0 \leq a \leq 19.0$, and $0 \leq b \leq 2.0$. A Si—K absorption edge XANES spectrum obtained when performing an XAFS measurement on particles has a peak A present in a range of 1842±1 eV, a peak B present in a range of 1845±1 eV, and a peak C present in a range of 1848±1 eV. An intensity ratio A/C is 0.40 or less, and an intensity ratio B/C is 0.60 or less.

10 Claims, 14 Drawing Sheets

(51) Int. Cl.
*C22C 38/02* (2006.01)
*H01F 1/153* (2006.01)

(56) References Cited

U.S. PATENT DOCUMENTS

| | | | | |
|---|---|---|---|---|
| 2010/0237978 | A1* | 9/2010 | Brunner | H01F 1/15308 264/9 |
| 2010/0265028 | A1 | 10/2010 | McHenry et al. | |
| 2018/0301258 | A1 | 10/2018 | Kudo | |
| 2019/0214171 | A1 | 7/2019 | Yoshidome et al. | |
| 2019/0283127 | A1 | 9/2019 | Kinouchi et al. | |
| 2020/0135369 | A1 | 4/2020 | Yoshidome et al. | |
| 2020/0357547 | A1 | 11/2020 | Harada et al. | |
| 2021/0379657 | A1 | 12/2021 | Nakaseko et al. | |
| 2022/0230789 | A1 | 7/2022 | Enomoto et al. | |
| 2022/0351884 | A1 | 11/2022 | Amano et al. | |
| 2023/0025020 | A1 | 1/2023 | Jian et al. | |
| 2024/0071663 | A1 | 2/2024 | Hosono et al. | |
| 2024/0278316 | A1* | 8/2024 | Watanabe | B22F 1/05 |

FOREIGN PATENT DOCUMENTS

| | | | |
|---|---|---|---|
| JP | 2004-156134 | A | 6/2004 |
| JP | 2006-241569 | A | 9/2006 |
| JP | 2008-231462 | A | 10/2008 |
| JP | 2010-209409 | A | 9/2010 |
| JP | 2016-015357 | A | 1/2016 |
| JP | 2020-070468 | A | 5/2020 |
| JP | 2022-111641 | A | 8/2022 |
| KR | 2009-0106639 | A | 10/2009 |
| WO | 2020-075814 | A1 | 4/2020 |
| WO | 2021-066056 | A1 | 4/2021 |

OTHER PUBLICATIONS

Li et al. "The Preparation of High-Purity Iron (99.987%) Employing a Process of Direct Reduction-Melting Separation-Slag Refining." Materials 2020, 13, 1839; doi:10.3390/ma13081839. pp. 1-15. Apr. 14, 2020. (Year: 2020).*

* cited by examiner

AMORPHOUS ALLOY SOFT MAGNETIC POWDER, DUST CORE, MAGNETIC ELEMENT, AND ELECTRONIC DEVICE

The present application is based on, and claims priority from JP Application Serial Number 2022-010904, filed Jan. 27, 2022, the disclosure of which is hereby incorporated by reference herein in its entirety.

BACKGROUND

1. Technical Field

The present disclosure relates to an amorphous alloy soft magnetic powder, a dust core, a magnetic element, and an electronic device.

2. Related Art

In order to reduce a size and increase an output of various electronic devices including a magnetic element, it is necessary to increase a saturation magnetic flux density of a soft magnetic powder contained in a dust core while maintaining a low coercive force.

JP-A-2020-070468 discloses a soft magnetic alloy powder having a main component with a composition formula $(Fe_{(1-(\alpha+\beta))}X1_{\alpha}X2_{\beta})_{(1-(a+b+c+d+e+f))}M_aB_bP_cSi_dC_eS_f$, where X1 is one or more selected from the group consisting of Co and Ni, X2 is one or more selected from the group consisting of Al, Mn, Ag, Zn, Sn, As, Sb, Cu, Cr, Bi, N, O, and rare earth elements, and M is one or more selected from the group consisting of Nb, Hf, Zr, Ta, Mo, W, Ti, and V. In this powder, $0 \leq a \leq 0.160$, $0.020 \leq b \leq 0.200$, $0 \leq c \leq 0.150$, $0 \leq d \leq 0.060$, $0 \leq e \leq 0.030$, $0.0010 \leq f \leq 0.030$, $0.005 \leq f/b \leq 1.50$, $\alpha \geq 0$, $\beta \geq 0$, and $0 \leq \alpha+\beta \leq 0.50$. JP-A-2020-070468 discloses that a saturation magnetization after a heat treatment is improved by selecting Co as X1.

However, the soft magnetic alloy powder disclosed in JP-A-2020-070468 still has room for improvement in terms of achieving low coercive force while increasing the saturation magnetization. That is, it is a problem to achieve both a high saturation magnetic flux density and a low coercive force in the soft magnetic powder.

SUMMARY

An amorphous alloy soft magnetic powder according to an application example of the present disclosure has a composition represented by $(Fe_xCo_{1-x})_{100-(a+b)}(Si_yB_{1-y})_a M_b$, where M is at least one selected from the group consisting of C, S, P, Sn, Mo, Cu, and Nb, and x, y, a, and b satisfy $0.73 \leq x \leq 0.85$, $0.02 \leq y \leq 0.10$, $13.0 \leq a \leq 19.0$, and $0 \leq b \leq 2.0$. A Si—K absorption edge XANES spectrum obtained when performing an XAFS measurement on particles with an analysis depth set to a bulk has a peak A present in a range where an energy is 1842±1 eV, a peak B present in a range where the energy is 1845±1 eV, and a peak C present in a range where the energy is 1848±1 eV, and an intensity ratio A/C is 0.40 or less, and an intensity ratio B/C is 0.60 or less where A is an intensity of the peak A, B is an intensity of the peak B, and C is an intensity of the peak C.

A dust core according to an application example of the present disclosure contains: the amorphous alloy soft magnetic powder according to the application example of the present disclosure.

A magnetic element according to an application example of the present disclosure includes: the dust core according to the application example of the present disclosure.

An electronic device according to an application example of the present disclosure includes: the magnetic element according to the application example of the present disclosure.

DESCRIPTION OF EXEMPLARY EMBODIMENTS

Figure 1:
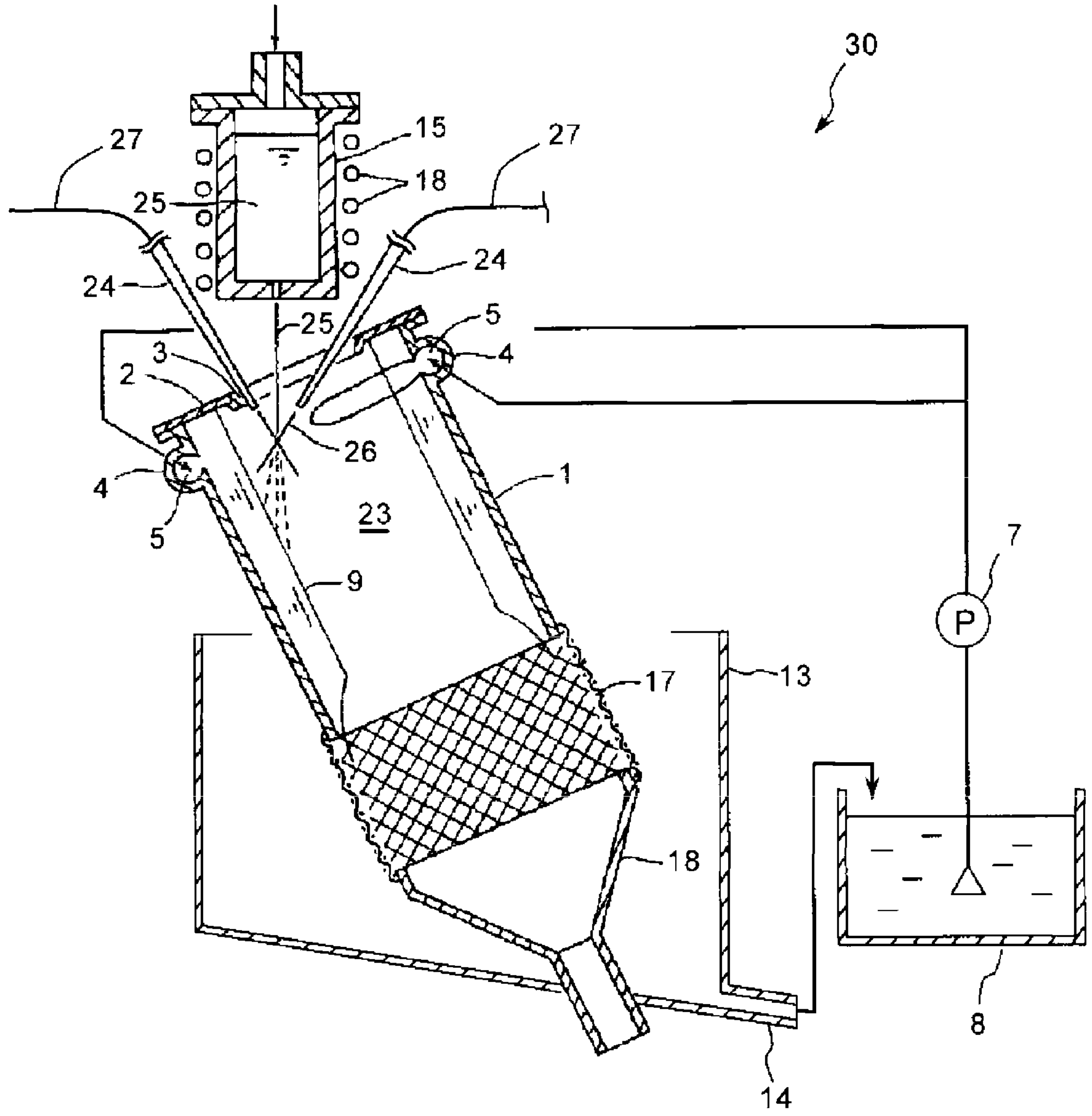
FIG. 1 is a longitudinal sectional view showing an example of an apparatus that produces an amorphous alloy soft magnetic powder by a rotary water atomization method.

Hereinafter, an amorphous alloy soft magnetic powder, a dust core, a magnetic element, and an electronic device according to the present disclosure will be described in detail based on a preferred embodiment shown in the accompanying drawings.

1. Amorphous Alloy Soft Magnetic Powder

An amorphous alloy soft magnetic powder according to the embodiment is an amorphous alloy powder exhibiting soft magnetism. The amorphous alloy soft magnetic powder can be applied to any application, and is formed by, for example, binding particles to each other. Accordingly, a dust core to be used in a magnetic element is obtained.

The amorphous alloy soft magnetic powder according to the embodiment is a powder having a composition represented by $(Fe_xCo_{1-x})_{100-(a+b)}(Si_yB_{1-y})_aM_b$. Here, M is at least one selected from the group consisting of C, S, P, Sn, Mo, Cu, and Nb. x, y, a, and b satisfy $0.73 \le x \le 0.85$, $0.02 \le y \le 0.10$, $13.0 \le a \le 19.0$, and $0 \le b \le 2.0$.

When the amorphous alloy soft magnetic powder is subjected to an XAFS measurement on particles with an analysis depth set to a bulk, a Si—K absorption edge XANES spectrum obtained satisfies the following features. When A is an intensity of a peak A present in a range where an X-ray energy is 1842±1 eV, B is an intensity of a peak B present in a range where the X-ray energy is 1845±1 eV, and C is an intensity of a peak C present in a range where the X-ray energy is 1848±1 eV, an intensity ratio A/C is 0.40 or less, and an intensity ratio B/C is 0.60 or less.

Such an amorphous alloy soft magnetic powder achieves both a high saturation magnetic flux density and a low coercive force. Therefore, by using the amorphous alloy soft magnetic powder, a size of the magnetic element can be reduced and an output thereof can be increased.

1.1. Composition

The composition of the amorphous alloy soft magnetic powder will be described in detail below. As described above, the amorphous alloy soft magnetic powder according to the embodiment has a composition represented by $(Fe_xCo_{1-x})_{100-(a+b)}(Si_yB_{1-y})_aM_b$. The composition formula represents a ratio in a composition containing at least five elements of Fe, Co, Si, B, and M.

Fe (iron) greatly affects basic magnetic properties and mechanical properties of the amorphous alloy soft magnetic powder according to the embodiment.

A content of Fe is not particularly limited, and is set such that Fe is a main component, that is, a ratio of the number of atoms is highest in the amorphous alloy soft magnetic powder. In the amorphous alloy soft magnetic powder according to the present embodiment, the content of Fe is preferably 61.0 mass % or more and 71.0 mass % or less, more preferably 63.0 mass % or more and 69.0 mass % or less, and still more preferably 65.0 mass % or more and 68.0 mass % or less. When the content of Fe is less than the lower limit value described above, a magnetic flux density of the amorphous alloy soft magnetic powder may decrease depending on the composition. On the other hand, when the content of Fe exceeds the upper limit value described above, it may be difficult to stably form an amorphous structure depending on the composition.

x represents a ratio of the number of Fe atoms to a total number of atoms when a sum of the number of Fe atoms and the number of Co atoms is 1. In the amorphous alloy soft magnetic powder according to the present embodiment, $0.73 \le x \le 0.85$. It is preferable that $0.75 \le x \le 0.83$, and more preferable that $0.77 \le x \le 0.81$.

Co (cobalt) can increase the saturation magnetic flux density of the amorphous alloy soft magnetic powder.

When the sum of the number of Fe atoms and the number of Co atoms is 1, a ratio of the number of Co atoms to the total number of atoms is $0.15 \le 1-x \le 0.27$. It is preferable that $0.17 \le 1-x \le 0.25$, and more preferable that $0.19 \le 1-x \le 0.23$. When $1-x$ is within the above range, the saturation magnetic flux density of the amorphous alloy soft magnetic powder can be increased while reducing an increase in the coercive force.

When $1-x$ is less than the lower limit value described above, a content of Co to the content of Fe is too small. Therefore, the saturation magnetic flux density cannot be sufficiently increased. On the other hand, when $1-x$ exceeds the upper limit value described above, the content of Co to the content of Fe is too large. Therefore, it is difficult to stably form the amorphous structure, and the coercive force increases.

The content of Co is preferably 12.0 atomic % or more and 22.0 atomic % or less, and more preferably 15.0 atomic % or more and 19.0 atomic % or less.

Si (silicon) promotes, in the case of producing the amorphous alloy soft magnetic powder from a raw material, amorphization and increases magnetic permeability of the amorphous alloy soft magnetic powder. Accordingly, a low coercive force and high magnetic permeability can be achieved.

B (boron) promotes, in the case of producing the amorphous alloy soft magnetic powder from a raw material, the amorphization. In particular, by using Si and B in combination, the amorphization can be synergistically promoted based on a difference in an atomic radius between Si and B. Accordingly, the low coercive force and the high magnetic permeability can be achieved.

y represents a ratio of the number of Si atoms to the total number of atoms when a sum of the number of Si atoms and the number of B atoms is 1. In the amorphous alloy soft magnetic powder according to the present embodiment, $0.02 \le y \le 0.10$. It is preferable that $0.04 \le y \le 0.08$, and more preferable that $0.05 \le y \le 0.07$. By setting y within the above range, a balance between the number of Si atoms and the number of B atoms can be optimized. Accordingly, even when Fe and Co have relatively high concentrations, the amorphization can be sufficiently achieved. Therefore, by setting y within the above range, it is possible to achieve the low coercive force without impairing the high saturation magnetic flux density.

When y is less than the lower limit value described above and when y exceeds the upper limit value described above, the balance between the number of Si atoms and the number of B atoms is lost. Therefore, the amorphization cannot be promoted at a composition ratio in which Fe and Co have relatively high concentrations.

a affects a balance between Si and B and between Fe and Co. In the amorphous alloy soft magnetic powder according to the present embodiment, $13.0 \le a \le 19.0$. It is preferable that $14.0 \le a \le 18.0$, and more preferable that $15.0 \le a \le 17.0$. When a is within the above range, the balance between Si and B, which mainly promote the amorphization, and Fe and Co, which mainly increase the saturation magnetic flux density, is optimized.

When a is less than the lower limit value described above, an amount ratio of Si and B decreases, and an amount ratio of Fe and Co increases, so that the amorphization is difficult. On the other hand, when a exceeds the upper limit value described above, the amount ratio of Si and B increases, and the amount ratio of Fe and Co decreases, so that it is difficult to sufficiently increase the saturation magnetic flux density.

A content of Si is preferably 0.40 atomic % or more and 1.80 atomic % or less, and more preferably 0.80 atomic % or more and 1.50 atomic % or less.

A content of B is preferably 11.0 atomic % or more and 18.0 atomic % or less, and more preferably 14.0 atomic % or more and 16.0 atomic % or less.

M is at least one selected from the group consisting of C, S, P, Sn, Mo, Cu, and Nb. By containing a predetermined amount of M, the saturation magnetic flux density can be further increased. When M contains two or more of the above elements, the saturation magnetic flux density can be further increased as compared to a case in which M is not contained or a case in which one type of M is contained.

b represents a content of M. When a plurality of elements are contained as M, b is a total content of the plurality of elements. In the amorphous alloy soft magnetic powder according to the present embodiment, $0 \leq b \leq 2.0$. It is preferable that $0.5 \leq b \leq 1.5$, and more preferable that $0.7 \leq b \leq 1.2$. When b is within the above range, the saturation magnetic flux density can be increased without inhibiting the amorphization.

When b is less than the lower limit value described above, the effect described above may not be sufficiently obtained. On the other hand, when b exceeds the upper limit value described above, the amorphization is inhibited.

The amorphous alloy soft magnetic powder according to the embodiment may contain impurities other than the composition represented by $(Fe_xCo_{1-x})_{100-(a+b)}(Si_yB_{1-y})_a M_b$. Examples of the impurities include all elements other than the element described above. A total content of the impurities is preferably 1.0 mass % or less, more preferably 0.2 mass % or less, and still more preferably 0.1 mass % or less.

The composition of the amorphous alloy soft magnetic powder according to the embodiment is described in detail above, and the composition and the impurities are specified by the following analysis method.

Examples of the analysis method include iron and steel-atomic absorption spectrometry defined in JIS G 1257:2000, iron and steel-ICP emission spectrometry defined in JIS G 1258:2007, iron and steel-spark discharge emission spectrometry defined in JIS G 1253:2002, iron and steel-fluorescent X-ray spectrometry defined in JIS G 1256:1997, and gravimetric, titration and absorption spectrometric methods defined in JIS G1211 to JIS G1237.

Specific examples thereof include a solid emission spectrometer manufactured by SPECTRO, in particular, a spark discharge emission spectrometer, model: SPECTROLAB, type: LAVMB08A, or ICP apparatus CIROS120 type manufactured by Rigaku Corporation.

In particular, when C (carbon) and S (sulfur) are to be specified, an oxygen gas flow combustion (high-frequency induction furnace combustion)—infrared absorption method defined in JIS G 1211:2011 is also used. Specific examples of an analyzer include a carbon and sulfur analyzer, CS-200 manufactured by LECO Corporation.

In particular, when N (nitrogen) and O (oxygen) to be are specified, general rules of an iron and steel-nitrogen quantification method defined in JIS G 1228:1997 and a metal material oxygen quantification method defined in JIS Z 2613:2006 are also used. Specific examples of the analyzer include an oxygen and nitrogen analyzer, TC-300/EF-300 manufactured by LECO Corporation.

1.2. Powder Evaluation by XAFS Measurement

When the XAFS measurement is performed on the amorphous alloy soft magnetic powder according to the embodiment, an X-ray absorption spectrum is obtained. The XAFS measurement is an X-ray absorption fine structure measurement, and is an analysis method of examining, based on X-ray absorption specific to each element, a chemical state or a local structure of an element contained in particles. In the XAFS measurement, an X-ray absorption near edge structure (XANES) spectrum and an extended X-ray absorption fine structure (EXAFS) spectrum can be obtained. From the XANES spectrum, a chemical state (electronic state) such as a valence of an absorption atom is mainly obtained. From the EXAFS spectrum, a local structure (coordination environment) around the absorption atom is mainly obtained.

1.2.1. Feature (1)

In the amorphous alloy soft magnetic powder according to the embodiment, when the XAFS measurement is performed on the contained particles, a Si—K absorption edge XANES spectrum obtained has a peak A, a peak B, and a peak C satisfying the following intensity ratios as a feature (1).

When A is an intensity of the peak A present in a range where an energy is 1842±1 eV, B is an intensity of the peak B present in a range where the energy is 1845±1 eV, and C is an intensity of the peak C present in a range where the energy is 1848±1 eV, an intensity ratio A/C is 0.40 or less, and an intensity ratio B/C is 0.60 or less. The Si—K absorption edge XANES spectrum described above is a spectrum obtained by setting a depth of the XAFS measurement in particles to a bulk (a depth of about 10 μm). The depth of the XAFS measurement can be controlled from the bulk to a surface (less than a depth of 100 nm) by selecting a signal to be detected in the XAFS measurement. Specifically, when an X-ray is selected as a signal to be detected, the depth of the measurement can be set to the bulk. When an electron is selected as a signal to be detected, the depth of the measurement can be set to the surface. The "intensity of a peak" in the present specification refers to a height of a peak of a spectrum or a radial distribution function from a background.

The peak A is a structure belonging to a Fe—Si atom pair. The peak B is also a structure belonging to the Fe—Si atom pair. The peak C is a structure belonging to $SiO_2$.

The "peak" in the present specification includes not only a clearly upwardly convex shape having a vertex, but also a shape that is not upwardly convex, such as a shoulder structure. When neither of the upwardly convex shape nor the shoulder structure is present, an intensity of a maximum value within a specified range is regarded as an intensity of the peak.

The intensity ratio A/C is within the above range and the intensity ratio B/C is within the above range, which indicates that the intensity ratio of the peak belonging to a Fe—Si coordination representing a crystalline state is low. Therefore, satisfaction of the feature (1) indicates that a degree of amorphization is high in the particles contained in the amorphous alloy soft magnetic powder. As described above, such an amorphous alloy soft magnetic powder achieves the low coercive force derived from the high degree of amorphization without impairing the high saturation magnetic flux density caused by Fe or Co added at a high concentration.

The intensity ratio A/C is preferably 0.35 or less. The intensity ratio B/C is preferably 0.50 or less. The lower limit value may not be set, and is preferably 0.10 or more from a viewpoint of preventing variation in particles.

1.2.2. Feature (2)

In the amorphous alloy soft magnetic powder according to the embodiment, when the XAFS measurement is performed on the contained particles, a radial distribution function obtained by Fourier transform of a Si—K absorption edge EXAFS spectrum obtained preferably has a peak D, a peak E, and a peak F satisfying the following intensity ratios as a feature (2).

When D is an intensity of the peak D present in a range where an interatomic distance is 0.13±0.04 nm, E is an intensity of the peak E present in a range where the interatomic distance is 0.24±0.04 nm, and F is an intensity present in a range where the interatomic distance is 0.43±0.04 nm, an intensity ratio E/D is 0.60 or less, and an intensity ratio F/D is 0.40 or less. The above Si—K absorption edge EXAFS spectrum is a spectrum obtained by setting the depth of the XAFS measurement in particles to a bulk.

The peak D is a structure belonging to an O atom adjacent to a Si atom which is an absorption atom (first adjacent O atom). The peak E is a structure belonging to a Fe atom adjacent to the Si atom (first adjacent Fe atom). The peak F is a structure belonging to a Fe atom adjacent to the first adjacent Fe atom adjacent to the Si atom (second adjacent Fe atom).

The intensity ratio E/D is within the above range and the intensity ratio F/D is within the above range, which indicates that the intensity ratio of the peak corresponding to an interatomic distance representing a crystalline state is low. That is, it can be said that an amount of atoms deviated from an atomic arrangement in the crystalline state is relatively large. Therefore, satisfaction of the feature (2) indicates that the degree of amorphization is high in the particles contained in the amorphous alloy soft magnetic powder. Therefore, the amorphous alloy soft magnetic powder satisfying the feature (2) achieves both the high saturation magnetic flux density and the low coercive force.

The intensity ratio E/D is more preferably 0.50 or less. The intensity ratio F/D is more preferably 0.30 or less. The lower limit value may not be set, and is preferably 0.01 or more from the viewpoint of preventing variation in particles.

1.2.3. Feature (3)

In the amorphous alloy soft magnetic powder according to the embodiment, when the XAFS measurement is performed on the contained particles, a radial distribution function obtained by Fourier transform of a Fe—K absorption edge EXAFS spectrum obtained preferably has a peak G, a peak H, and a peak I satisfying the following intensity ratios as a feature (3).

When G is an intensity of the peak G present in a range where the interatomic distance is 0.22±0.04 nm, H is an intensity of the peak H present in a range where the interatomic distance is 0.36±0.04 nm, and I is an intensity of the peak I present in a range where the interatomic distance is 0.45±0.04 nm, an intensity ratio H/G is 0.20 or less, and an intensity ratio I/G is 0.20 or less. The above Fe—K absorption edge EXAFS spectrum is a spectrum obtained by setting the depth of the XAFS measurement in particles to a surface.

The peak G has a structure belonging to a Fe atom adjacent to a Fe atom which is an absorption atom (first adjacent Fe atom). The peak H is a structure belonging to a Fe atom adjacent to the first adjacent Fe atom (second adjacent Fe atom). The peak I is a structure belonging to a Fe atom adjacent to the second adjacent Fe atom (third adjacent Fe atom).

The intensity ratio H/G is within the above range and the intensity ratio I/G is within the above range, which indicates that the intensity ratio of the peak corresponding to an interatomic distance representing a crystalline state is low. That is, it can be said that an amount of atoms deviated from an atomic arrangement in the crystalline state is relatively large. Therefore, satisfaction of the feature (3) indicates that the degree of amorphization is high in the particles contained in the amorphous alloy soft magnetic powder. Therefore, the amorphous alloy soft magnetic powder satisfying the feature (3) achieves both the high saturation magnetic flux density and the low coercive force.

The intensity ratio H/G is more preferably 0.15 or less. The intensity ratio I/G is more preferably 0.15 or less. The lower limit value may not be set, and is preferably 0.01 or more from the viewpoint of preventing variation in particles.

The intensity ratio I/H is preferably less than 1.00, more preferably 0.90 or less, and still more preferably 0.80 or less. The intensity ratio I/H is an intensity ratio of the peak I belonging to the third adjacent Fe atom to the peak H belonging to the second adjacent Fe atom. Satisfaction of the above ranges indicates that the atomic arrangement of the third adjacent Fe atom is deviated from the crystalline state as compared with the second adjacent Fe atom. This indicates that the degree of amorphization is higher. Therefore, the amorphous alloy soft magnetic powder in which the intensity ratio I/H satisfies the above range has a lower coercive force.

The peak G is preferably present in a range where the interatomic distance is within the above range. In particular, the peak G is more preferably present in a range where the interatomic distance is 0.190 nm or more and 0.205 nm or less. The interatomic distance is shorter than the interatomic distance in the crystalline state. The presence of the peak G in such a range indicates that the atomic arrangement of the first adjacent Fe atom is sufficiently deviated from the crystalline state and the degree of amorphization is higher. Therefore, the amorphous alloy soft magnetic powder having the peak G within the above range has a lower coercive force.

1.2.4. Feature (4)

In the amorphous alloy soft magnetic powder according to the embodiment, when the XAFS measurement is performed on the contained particles, a radial distribution function obtained by Fourier transform of a Co—K absorption edge EXAFS spectrum obtained preferably has a peak J, a peak K, and a peak L satisfying the following intensity ratios as a feature (4).

When J is an intensity of the peak J present in a range where the interatomic distance is 0.22±0.04 nm, K is an intensity of the peak K present in a range where the interatomic distance is 0.35±0.04 nm, and L is an intensity of the peak L present in a range where the interatomic distance is 0.44±0.04 nm, an intensity ratio K/J is 0.20 or less, and an intensity ratio L/J is 0.20 or less. The above Co—K absorption edge EXAFS spectrum is a spectrum obtained by setting the depth of the XAFS measurement in particles to a surface.

The peak J has a structure belonging to a Fe atom adjacent to a Co atom which is an absorption atom (first adjacent Fe atom). The peak K is a structure belonging to a Fe atom adjacent to the first adjacent Fe atom (second adjacent Fe atom). The peak L is a structure belonging to a Fe atom adjacent to the second adjacent Fe atom (third adjacent Fe atom).

The intensity ratio K/J is within the above range and the intensity ratio L/J is within the above range, which indicates that the intensity ratio of the peak corresponding to an interatomic distance representing a crystalline state is low. That is, it can be said that an amount of atoms deviated from an atomic arrangement in the crystalline state is relatively large. Therefore, satisfaction of the feature (4) indicates that the degree of amorphization is high on the surface of the particles contained in the amorphous alloy soft magnetic powder. Therefore, the amorphous alloy soft magnetic powder satisfying the feature (4) achieves both the high saturation magnetic flux density and the low coercive force.

The intensity ratio K/J is more preferably 0.15 or less. The intensity ratio L/J is more preferably 0.15 or less. The lower limit value may not be set, and is preferably 0.01 or more from the viewpoint of preventing variation in particles.

The intensity ratio L/K is preferably less than 1.00, more preferably 0.90 or less, and still more preferably 0.80 or less. The intensity ratio L/K is an intensity ratio of the peak L belonging to the third adjacent Fe atom to the peak K belonging to the second adjacent Fe atom. Satisfaction of the above ranges indicates that the atomic arrangement of the third adjacent Fe atom is deviated from the crystalline state as compared with the second adjacent Fe atom. This indicates that the degree of amorphization is higher. Therefore, the amorphous alloy soft magnetic powder in which the intensity ratio L/K satisfies the above range has a lower coercive force.

The peak J is preferably present in a range where the interatomic distance is within the above range. In particular, the peak J is more preferably present in a range where the interatomic distance is 0.190 nm or more and 0.205 nm or less. The interatomic distance is shorter than the interatomic distance in the crystalline state. The presence of the peak J in such a range indicates that the atomic arrangement of the first adjacent Fe atom is sufficiently deviated from the crystalline state and the degree of amorphization is higher. Therefore, the amorphous alloy soft magnetic powder having the peak J present within the above range has a lower coercive force.

1.2.5. Feature (5)

In the amorphous alloy soft magnetic powder according to the embodiment, when the XAFS measurement is performed on the contained particles, a radial distribution function obtained by Fourier transform of a Co—K absorption edge EXAFS spectrum obtained preferably has a peak M, a peak N, and a peak O satisfying the following intensity ratios as a feature (5).

When M is an intensity of the peak M present in a range where the interatomic distance is 0.20±0.04 nm, N is an intensity of the peak N present in a range where the interatomic distance is 0.35±0.04 nm, and O is an intensity of the peak O present in a range where the interatomic distance is 0.45±0.04 nm, an intensity ratio N/M is 0.20 or less, and an intensity ratio O/M is 0.20 or less. The above Co—K absorption edge EXAFS spectrum is a spectrum obtained by setting the depth of the XAFS measurement in particles to a bulk.

The peak M has a structure belonging to a Fe atom adjacent to a Co atom which is an absorption atom (first adjacent Fe atom). The peak N is a structure belonging to a Fe atom adjacent to the first adjacent Fe atom (second adjacent Fe atom). The peak O is a structure belonging to a Fe atom adjacent to the second adjacent Fe atom (third adjacent Fe atom).

The intensity ratio N/M is within the above range and the intensity ratio O/M is within the above range, which indicates that the intensity ratio of the peak corresponding to an interatomic distance representing a crystalline state is low. That is, it can be said that an amount of atoms deviated from an atomic arrangement in the crystalline state is relatively large. Therefore, satisfaction of the feature (5) indicates that the degree of amorphization is high in the bulk of the particles contained in the amorphous alloy soft magnetic powder. Therefore, the amorphous alloy soft magnetic powder satisfying the feature (5) achieves both the high saturation magnetic flux density and the low coercive force.

The intensity ratio N/M is more preferably 0.15 or less. The intensity ratio O/M is more preferably 0.15 or less. The lower limit value may not be set, and is preferably 0.01 or more from the viewpoint of preventing variation in particles.

The intensity ratio O/N is preferably less than 1.00, more preferably 0.90 or less, and still more preferably 0.80 or less. The intensity ratio O/N is an intensity ratio of the peak O belonging to the third adjacent Fe atom to the peak N belonging to the second adjacent Fe atom. Satisfaction of the above ranges indicates that the atomic arrangement of the third adjacent Fe atom is deviated from the crystalline state as compared with the second adjacent Fe atom. This indicates that the degree of amorphization is higher. Therefore, the amorphous alloy soft magnetic powder in which the intensity ratio O/N satisfies the above range has a lower coercive force.

The peak M is preferably present in a range where the interatomic distance is within the above range. In particular, the peak M is more preferably present in a range where the interatomic distance is 0.190 nm or more and 0.201 nm or less. The interatomic distance is shorter than the interatomic distance in the crystalline state. The presence of the peak M in such a range indicates that the atomic arrangement of the first adjacent Fe atom is sufficiently deviated from the crystalline state and the degree of amorphization is higher. Therefore, the amorphous alloy soft magnetic powder having the peak M within the above range has a lower coercive force.

1.3. XAFS Measurement Method

The XAFS measurement can be performed under the following conditions.

- Measurement facility: Aichi Synchrotron Radiation Center
- Acceleration energy: 1.2 GeV
- Accumulated current value: 300 mA
- Monochromatization conditions: White X-rays from a bending magnet are monochromatized by a two-crystal spectrometer and used for measurement.
- Utilization beamline (BL) and measurement region: BL6N1 (in the case of obtaining of Si—K absorption edge), BL5S1 (in the case of obtaining of Fe—K absorption edge and Co—K absorption edge)
- Incident angle to a sample: 20° (in the case of obtaining of Si—K absorption edge), 15° (in the case of obtaining of Fe—K absorption edge and Co—K absorption edge)
- The incident angle is an incident angle of X-rays with respect to a normal line of a sample surface.

Energy calibration:

Before obtaining the Si—K absorption edge XANES spectrum, a S—K absorption edge XANES spectrum of $K_2SO_4$ possessed by BL is obtained with a total electron yield (TEY), and calibration is performed such that a peak top thereof is 2481.70 eV. Before the XAFS measurement is performed on Fe and Co, transmission measurement is performed on Fe-foil and Co-foil to calibrate an energy axis.

Measurement method: simultaneous measurement of a converted electron yield (CEY) and a partial fluorescence yield (PFY)

Preparation of measurement: introduction into a He atmospheric pressure chamber and replacement of He gas for about 30 minutes before measurement $I_0$ measurement method: Au-mesh Data Processing for obtaining radial distribution function:

XAFS spectrum data is obtained by a Quick XAFS method. A background noise is subtracted from the obtained XAFS spectrum data by a standard procedure. An energy $E_0$ (x axis) of a K absorption edge in each spectrum is an energy value (x axis) at which a first-order differential coefficient is maximum in a spectrum near the K absorption edge in an X-ray absorption spectrum. Subsequently, with the absorption edge energy $E_0$ as an origin, a baseline with an intensity axis of zero is set such that an average intensity in a range of, for example, −150 eV to 30 eV is zero. A baseline with the intensity axis of 1 is also set such that the average intensity in the range of +150 eV to +450 eV is 1. Subsequently, a waveform is adjusted using the two baselines.

Next, based on the X-ray absorption spectrum prepared as described above, EXAFS spectra of the K absorption edge with respect to Si, Fe, and Co are obtained and corresponding radial distribution functions are obtained as follows. First, EXAFS vibration analysis is performed on the adjusted X-ray absorption spectrum data using EXAFS analysis software Athena. For each spectrum, an absorbance ($\mu_0$) of an isolated atom is estimated by a Spline Smoothing method, and an EXAFS function $\chi(k)$ is extracted. Finally, an EXAFS function $k^3\chi(k)$ weighted by $k^3$ is Fourier-transformed in a range of k, for example, of 3.0 $Å^{-1}$ to 12.0 $Å^{-1}$. Accordingly, the radial distribution function is obtained.

1.4. Other Characteristics

The degree of the amorphization in the amorphous alloy soft magnetic powder can be specified based on a degree of crystallization. The degree of crystallization in the amorphous alloy soft magnetic powder is calculated based on a spectrum obtained by X-ray diffraction of the amorphous alloy soft magnetic powder based on the following equation.

$$\text{Degree of crystallization}=\{\text{crystal-derived intensity}/(\text{crystal-derived intensity}+\text{amorphous-derived intensity})\}\times 100$$

As an X-ray diffractometer, for example, RINT2500V/PC manufactured by Rigaku Corporation is used.

The degree of crystallization measured by such a method is preferably 70% or less, and more preferably 60% or less. Accordingly, improvement in the soft magnetism due to the amorphization is more remarkable. As a result, an amorphous alloy soft magnetic powder having a sufficiently low coercive force is obtained. In other words, it is preferable that the amorphous alloy soft magnetic powder is entirely amorphized, and may contain a crystal structure at a volume ratio of, for example, 70% or less.

An average particle diameter D50 of the amorphous alloy soft magnetic powder is not particularly limited, and is preferably 5.0 μm or more and 60.0 μm or less, more preferably 10.0 μm or more and 50.0 μm or less, and still more preferably 20.0 μm or more and 40.0 μm or less. By using the amorphous alloy soft magnetic powder having such an average particle diameter, a high powder compacting density can be obtained. As a result, a packing density of the dust core can be increased, and the high saturation magnetic flux density and the high magnetic permeability can be obtained.

The average particle diameter D50 of the amorphous alloy soft magnetic powder is determined as a particle diameter whose accumulation is 50% from a small diameter side in a volume-based particle size distribution obtained by a laser diffraction method.

When the average particle diameter of the amorphous alloy soft magnetic powder is less than the lower limit value described above, the particle diameter is too small. Therefore, the degree of crystallization may not be sufficiently lowered. On the other hand, when the average particle diameter of the amorphous alloy soft magnetic powder exceeds the upper limit value described above, the particle diameter is too large. Therefore, a filling property during powder compacting may decrease.

Further, in the volume-based particle size distribution of the amorphous alloy soft magnetic powder obtained by the laser diffraction method, when a particle diameter whose accumulation is 10% from the small diameter side is defined as D10, and a particle diameter whose accumulation is 90% from the small diameter side is defined as D90, (D90−D10)/D50 is preferably about 1.5 or more and 3.5 or less, and more preferably about 2.0 or more and 3.0 or less. (D90−D10)/D50 is an index indicating a degree of expansion of the particle size distribution. When the index is within the above range, the filling property of the amorphous alloy soft magnetic powder is particularly good. Accordingly, it is possible to obtain an amorphous alloy soft magnetic powder from which a dust core having a particularly high saturation magnetic flux density can be produced.

A coercive force of the amorphous alloy soft magnetic powder according to the embodiment is 24 A/m or more (0.3 Oe or more) and 199 A/m or less (2.5 Oe or less), preferably 40 A/m or more (0.5 Oe or more) and 175 A/m or less (2.2 Oe or less), and more preferably 56 A/m or more (0.7 Oe or more) 159 A/m or less (2.0 Oe or less).

By using such an amorphous alloy soft magnetic powder having a relatively small coercive force, a dust core capable of sufficiently reducing a hysteresis loss can be produced even at a high frequency.

When the coercive force is less than the lower limit value described above, it is difficult to stably produce such an amorphous alloy soft magnetic powder having the low coercive force. Alternatively, when the coercive force is excessively pursued, the saturation magnetic flux density is affected and the saturation magnetic flux density decreases. On the other hand, when the coercive force exceeds the upper limit value described above, since the hysteresis loss is increased at a high frequency, an iron loss of the dust core is increased.

The coercive force of the amorphous alloy soft magnetic powder can be measured by, for example, a vibrating sample magnetometer such as TM-VSM1230-MHHL manufactured by Tamakawa Co., Ltd.

The saturation magnetic flux density of the amorphous alloy soft magnetic powder according to the embodiment is 1.60 T or more and 2.20 T or less, preferably 1.60 T or more and 2.10 T or less, and more preferably 1.65 T or more and 2.00 T or less.

By using such an amorphous alloy soft magnetic powder having a relatively high saturation magnetic flux density, a dust core having a high saturation magnetic flux density can be obtained. According to such a dust core, the size of the magnetic element can be reduced and the output thereof can be increased.

When the saturation magnetic flux density is less than the lower limit value described above, it is difficult to reduce the size of the magnetic element and increase the output thereof. On the other hand, when the saturation magnetic flux density exceeds the upper limit value described above, it is difficult to stably produce the amorphous alloy soft magnetic powder having such a saturation magnetic flux density. Alternatively, when the saturation magnetic flux density is excessively pursued, the coercive force is affected and the coercive force increases.

The saturation magnetic flux density of the amorphous alloy soft magnetic powder is measured by the following method.

First, a true specific gravity ρ of a soft magnetic powder is measured by a full-automatic gas substitution type densitometer, AccuPyc 1330 manufactured by Micromeritics Corporation. Next, a maximum magnetization Mm of the soft magnetic powder is measured by a vibrating sample magnetometer, VSM system, TM-VSM1230-MHHL manufactured by Tamakawa Co., Ltd. Then, a saturation magnetic flux density Bs is calculated according to the following equation.

$$Bs=4\pi/10000\times\rho\times Mm.$$

The magnetic permeability of the amorphous alloy soft magnetic powder according to the embodiment at a measurement frequency of 100 kHz is preferably 20.0 or more, and more preferably 21.0 or more. Even when a high magnetic field is applied, such an amorphous alloy soft magnetic powder contributes to implementation of a dust core in which the magnetic flux density is less likely to be saturated, that is, the saturation magnetic flux density is high. An upper limit value of the magnetic permeability is not particularly limited, and is 50.0 or less in consideration of stable production.

The magnetic permeability of the amorphous alloy soft magnetic powder can be measured, for example, as a relative magnetic permeability, that is, an effective magnetic permeability, obtained based on a self-inductance of a closed magnetic circuit dust core coil by preparing a dust core having a toroidal shape. For measurement of the magnetic permeability, for example, an impedance analyzer such as 4194A manufactured by Agilent Technologies, Inc. is used, and a measurement frequency is set to 1 MHz. The number of turns of an exciting coil is seven, and a wire diameter of a winding is 0.6 mm.

In the amorphous alloy soft magnetic powder, an apparent density and a tap density are preferably within predetermined ranges. Specifically, when the apparent density [g/cm$^3$] of the amorphous alloy soft magnetic powder is 100, the tap density [g/cm$^3$] is preferably 103 or more and 120 or less, more preferably 105 or more and 115 or less, and still more preferably 107 or more and 113 or less. It can be said that such an amorphous alloy soft magnetic powder is relatively difficult to be filled when not tapped (vibrated), and is easy to be filled when tapped. Based on this fact, when the tap density is within the above range, it can be said that the powder has a particle size distribution in which the number of irregularly shaped particles is relatively small and the filling property is high. Such an amorphous alloy soft magnetic powder can be produced into a dust core having a high density. Therefore, the saturation magnetic flux density of the dust core can be particularly increased.

The apparent density of the amorphous alloy soft magnetic powder is preferably 4.55 g/cm$^3$ or more and 4.80 g/cm$^3$ or less, and more preferably 4.58 g/cm$^3$ or more and 4.70 g/cm$^3$ or less.

The tap density of the amorphous alloy soft magnetic powder is preferably 4.95 g/cm$^3$ or more and 5.30 g/cm$^3$ or less, and more preferably 5.00 g/cm$^3$ or more and 5.20 g/cm$^3$ or less.

When the apparent density and the tap density of the amorphous alloy soft magnetic powder are within the above ranges, the saturation magnetic flux density of the dust core can be particularly increased.

When a relative value of the tap density is less than the lower limit value described above, the filling property of the amorphous alloy soft magnetic powder may decrease in the case of compressing the amorphous alloy soft magnetic powder to obtain a dust core. On the other hand, when the relative value of the tap density exceeds the upper limit value described above, a shrinkage ratio may increase in the case of compressing the amorphous alloy soft magnetic powder to obtain a dust core. Therefore, the dust core is likely to be deformed, and dimensional accuracy may be reduced.

The apparent density of the amorphous alloy soft magnetic powder is measured in accordance with a metal powder-apparent density measurement method specified in JIS Z 2504:2012.

The tap density of the amorphous alloy soft magnetic powder is measured in accordance with a metal powder-tap density measurement method specified in JIS Z 2512:2012.

1.5. Effects of Embodiment

As described above, the amorphous alloy soft magnetic powder according to the embodiment has a composition represented by $(Fe_xCo_{1-x})_{100-(a+b)}(Si_yB_{1-y})_aM_b$, where M is at least one selected from the group consisting of C, S, P, Sn, Mo, Cu, and Nb, and x, y, a, and b satisfy $0.73\leq x\leq 0.85$, $0.02\leq y\leq 0.10$, $13.0\leq a\leq 19.0$, and $0\leq b\leq 2.0$.

In the amorphous alloy soft magnetic powder having the above composition, when the XAFS measurement is performed on the particles with the analysis depth set to the bulk, the Si—K absorption edge XANES spectrum obtained has the peak A, the peak B, and the peak C satisfying the following intensity ratios.

When A is an intensity of the peak A present in a range where an energy is 1842±1 eV, B is an intensity of the peak B present in a range where the energy is 1845±1 eV, and C is an intensity of the peak C present in a range where the energy is 1848±1 eV, the intensity ratio A/C is 0.40 or less, and the intensity ratio B/C is 0.60 or less.

By satisfying the intensity ratio in such a range, the particles contained in the amorphous alloy soft magnetic powder have a high degree of amorphization. Therefore, it is possible to obtain the amorphous alloy soft magnetic powder that achieves the low coercive force derived from the high degree of amorphization without impairing the high saturation magnetic flux density caused by Fe or Co added at a high concentration. That is, an amorphous alloy soft magnetic powder having both the high saturation magnetic flux density and the low coercive force can be obtained.

In the amorphous alloy soft magnetic powder according to the present embodiment, the radial distribution function obtained by Fourier transform of the Si—K absorption edge EXAFS spectrum obtained by performing the XAFS measurement with the analysis depth set to the bulk has the peak D, the peak E, and the peak F satisfying the following intensity ratios.

When D is an intensity of the peak D present in a range where an interatomic distance is 0.13±0.04 nm, E is an intensity of the peak E present in a range where the interatomic distance is 0.24±0.04 nm, and F is an intensity present in a range where the interatomic distance is 0.43±0.04 nm, the intensity ratio E/D is 0.60 or less, and the intensity ratio F/D is 0.40 or less.

By satisfying the intensity ratio in such a range, the particles contained in the amorphous alloy soft magnetic powder have a high degree of amorphization. Therefore, the amorphous alloy soft magnetic powder that achieves both the high saturation magnetic flux density and the low coercive force can be obtained.

In the amorphous alloy soft magnetic powder according to the present embodiment, the radial distribution function obtained by Fourier transform of the Fe—K absorption edge EXAFS spectrum obtained by performing the XAFS measurement with the analysis depth set to the surface has the peak G, the peak H, and the peak I satisfying the following intensity ratios.

When G is an intensity of the peak G present in a range where the interatomic distance is 0.22±0.04 nm, H is an intensity of the peak H present in a range where the interatomic distance is 0.36±0.04 nm, and I is an intensity of the peak I present in a range where the interatomic distance is 0.45±0.04 nm, the intensity ratio H/G is 0.20 or less, and the intensity ratio I/G is 0.20 or less.

By satisfying the intensity ratio in such a range, the particles contained in the amorphous alloy soft magnetic powder have a high degree of amorphization. Therefore, the amorphous alloy soft magnetic powder that achieves both the high saturation magnetic flux density and the low coercive force can be obtained.

The peak G is preferably present in a range where the interatomic distance is 0.190 nm or more and 0.205 nm or less. Accordingly, the particles contained in the amorphous alloy soft magnetic powder have a particularly high degree of amorphization.

In the amorphous alloy soft magnetic powder according to the present embodiment, the radial distribution function obtained by Fourier transform of the Co—K absorption edge EXAFS spectrum obtained by performing the XAFS measurement with the analysis depth set to the surface has the peak J, the peak K, and the peak L satisfying the following intensity ratios.

When J is an intensity of the peak J present in a range where the interatomic distance is 0.22±0.04 nm, K is an intensity of the peak K present in a range where the interatomic distance is 0.35±0.04 nm, and L is an intensity of the peak L present in a range where the interatomic distance is 0.44±0.04 nm, the intensity ratio K/J is 0.20 or less, and the intensity ratio L/J is 0.20 or less.

By satisfying the intensity ratio in such a range, the particles contained in the amorphous alloy soft magnetic powder have a high degree of amorphization. Therefore, the amorphous alloy soft magnetic powder that achieves both the high saturation magnetic flux density and the low coercive force can be obtained.

The peak J is preferably present in a range where the interatomic distance is 0.190 nm or more and 0.205 nm or less. Accordingly, the particles contained in the amorphous alloy soft magnetic powder have a particularly high degree of amorphization.

In the amorphous alloy soft magnetic powder according to the present embodiment, the radial distribution function obtained by Fourier transform of the Co—K absorption edge EXAFS spectrum obtained by performing the XAFS measurement with the analysis depth set to the bulk has the peak M present in a range where the interatomic distance is 0.190 nm or more and 0.201 nm or less. Accordingly, the particles contained in the amorphous alloy soft magnetic powder have a particularly high degree of amorphization.

2. Method of Producing Amorphous Alloy Soft Magnetic Powder

Next, a method of producing an amorphous alloy soft magnetic powder will be described.

The amorphous alloy soft magnetic powder may be produced by any production method, and is produced by, for example, an atomization method such as a water atomization method, a gas atomization method, or a rotary water atomization method, or various powdering methods such as a reduction method, a carbonyl method, or a pulverization method.

Examples of the atomization method include, depending on a type of a cooling medium or an apparatus configuration, a water atomization method, a gas atomization method, and a rotary water atomization method. Among these methods, the amorphous alloy soft magnetic powder is preferably produced by the atomization method, more preferably produced by the water atomization method or the rotary water atomization method, and still more preferably produced by the rotary water atomization method. The atomization method is a method of producing a powder by pulverizing and cooling a molten raw material by colliding the molten raw material with a fluid such as a liquid or gas injected at a high speed. By using such an atomization method, the amorphous alloy soft magnetic powder having good amorphization and a good filling property can be efficiently produced.

In the present specification, the "water atomization method" refers to a method in which a liquid such as water or oil is used as a coolant, and in a state where the liquid is sprayed in an inverted conical shape while converging on one point, a molten metal is caused to flow down toward and collide with the convergence point, thereby producing a metal powder.

On the other hand, according to the rotary water atomization method, since the molten metal can be cooled at an extremely high speed, the amorphization is particularly easily achieved.

When the amorphous alloy soft magnetic powder is to be produced, a cooling speed of the molten metal is preferably more than $10^6$ K/sec, and more preferably 10?K/sec or more. Accordingly, a sufficiently amorphized amorphous alloy soft magnetic powder is obtained. That is, even when the composition has a relatively high content of Fe or Co, the amorphization can be achieved. In particular, according to the rotary water atomization method, a cooling speed of $10^7$ K/sec or more can be easily implemented.

Hereinafter, the method of producing the amorphous alloy soft magnetic powder by the rotary water atomization method will be further described.

In the rotary water atomization method, a coolant is injected and supplied along an inner circumferential surface of a cooling tubular body and swirled along the inner circumferential surface of the cooling tubular body to form a coolant layer at the inner circumferential surface. Meanwhile, a raw material of the amorphous alloy soft magnetic powder is melted, and liquid or gas jet is sprayed to the obtained molten metal while the melted metal is naturally dropped. When the molten metal is scattered in this way, the scattered molten metal is taken into the coolant layer. As a result, the scattered and pulverized molten metal is rapidly cooled and solidified, and the amorphous alloy soft magnetic powder is obtained.

FIG. 1 is a longitudinal sectional view showing an example of an apparatus that produces the amorphous alloy soft magnetic powder by the rotary water atomization method.

A powder producing apparatus 30 shown in FIG. 1 includes a cooling tubular body 1, a crucible 15, a pump 7, and a jet nozzle 24. The cooling tubular body 1 is a tubular body for forming a coolant layer 9 at an inner circumferential surface of the cooling tubular body 1. The crucible 15 is a supply container for causing a molten metal 25 to flow down and for supplying the molten metal 25 to a space portion 23 inside the coolant layer 9. The pump 7 supplies a coolant to the cooling tubular body 1. The jet nozzle 24 injects a gas jet 26 for dividing the downflow molten metal 25 in the form of a minute flow into liquid droplets.

The molten metal 25 is prepared according to the composition of the amorphous alloy soft magnetic powder.

The cooling tubular body 1 has a cylindrical shape, and is provided such that a tubular body axis line extends along a vertical direction or is inclined at an angle of 30° or less with respect to the vertical direction.

An upper end opening of the cooling tubular body 1 is closed by a lid body 2. An opening portion 3 for supplying the molten metal 25 flowing down to the space portion 23 of the cooling tubular body 1 is formed in the lid body 2.

A coolant injecting pipe 4 for injecting the coolant to the inner circumferential surface of the cooling tubular body 1 is provided in an upper portion of the cooling tubular body 1. A plurality of dispensing ports 5 of the coolant injecting pipe 4 are provided at equal intervals along a circumferential direction of the cooling tubular body 1.

The coolant injecting pipe 4 is coupled to a tank 8 via pipes to which the pump 7 is coupled. The coolant in the tank 8 absorbed up by the pump 7 is injected and supplied via the coolant injecting pipe 4 into the cooling tubular body 1. Accordingly, the coolant gradually flows down while rotating along the inner circumferential surface of the cooling tubular body 1, and accordingly, the coolant layer 9 along the inner circumferential surface is formed. A cooler may be interposed as necessary in the tank 8 or in a middle of a circulation flow path. As the coolant, in addition to water, oil such as silicone oil is used, and various additives may be further added. By removing dissolved oxygen in the coolant in advance, oxidation of the produced powder can be reduced.

A cylindrical liquid draining mesh body 17 is continuously provided at a lower portion of the cooling tubular body 1. A funnel-shaped powder recovery container 18 is provided at a lower side of the liquid draining mesh body 17. A coolant recovery cover 13 is provided around the liquid draining mesh body 17 so as to cover the liquid draining mesh body 17. A drain port 14 formed in a bottom portion of the coolant recovery cover 13 is coupled via pipes to the tank 8.

The jet nozzle 24 is provided in the space portion 23. The jet nozzle 24 is attached to a tip end of a gas supply pipe 27 and is inserted through the opening portion 3 of the lid body 2, and an injection port of the jet nozzle 24 is directed to the molten metal 25 in the form of minute flow.

In order to produce the amorphous alloy soft magnetic powder in such a powder producing apparatus 30, first, the pump 7 is operated to form the coolant layer 9 on the inner circumferential surface of the cooling tubular body 1. Next, the molten metal 25 in the crucible 15 is caused to flow down into the space portion 23. When the gas jet 26 is sprayed to the molten metal 25 flowing down, the molten metal 25 is scattered, and the pulverized molten metal 25 is caught in the coolant layer 9. As a result, the pulverized molten metal 25 is cooled and solidified, and the amorphous alloy soft magnetic powder is obtained.

In the rotary water atomization method, since an extremely high cooling speed can be stably maintained by continuously supplying the coolant, the amorphization of the produced amorphous alloy soft magnetic powder is promoted.

Since the molten metal 25 miniaturized to a certain size by the gas jet 26 falls by inertia until the molten metal 25 is caught in the coolant layer 9, liquid droplets are made spherical at that time. As a result, an amorphous alloy soft magnetic powder having a good particle size distribution and an excellent filling property can be produced.

For example, a downflow amount of the molten metal 25 flowing down from the crucible 15 varies depending on an apparatus size and the like, and is preferably more than 1.0 kg/min and 20.0 kg/min or less, and more preferably 2.0 kg/min or more and 10.0 kg/min or less. Accordingly, since an amount of the molten metal 25 flowing down for a certain period of time can be optimized, a sufficiently amorphized amorphous alloy soft magnetic powder can be efficiently produced. The cooling speed of the molten metal 25 per unit amount can be increased, and the degree of amorphization can be increased.

A pressure of the gas jet 26 slightly varies depending on a configuration of the jet nozzle 24, and is preferably 2.0 MPa or more and 20.0 MPa or less, and more preferably 3.0 MPa or more and 10.0 MPa or less. Accordingly, a particle diameter when the molten metal 25 is scattered can be optimized, and a sufficiently amorphized amorphous alloy soft magnetic powder can be produced. That is, when the pressure of the gas jet 26 is less than the lower limit value described above, it is difficult to sufficiently and finely scatter the molten metal 25, and the particle diameter is likely to increase. As a result, the cooling speed of inside of the liquid droplets decreases, and the amorphization may be insufficient. On the other hand, when the pressure of the gas jet 26 exceeds the upper limit value described above, the particle diameter of the liquid droplets after the scattering may be too small. As a result, the liquid droplets are slowly cooled by the gas jet 26, and rapid cooling by the coolant layer 9 may not be performed, which may result in insufficient amorphization.

A flow rate of the gas jet 26 is not particularly limited, and is preferably 1.0 $Nm^3$/min or more and 20.0 $Nm^3$/min or less.

A pressure at a time of injecting the coolant supplied to the cooling tubular body 1 is preferably about 5 MPa or more and 200 MPa or less, and more preferably about 10 MPa or more and 100 MPa or less. Accordingly, a flow speed of the coolant layer 9 is optimized, and the pulverized molten metal 25 is less likely to have an irregular shape. As a result, an amorphous alloy soft magnetic powder having a more excellent filling property can be obtained. The cooling speed of the molten metal 25 by the coolant can be sufficiently increased.

As described above, the amorphous alloy soft magnetic powder is obtained.

The particle diameter of the amorphous alloy soft magnetic powder can be reduced by, for example, performing operations such as reducing the downflow amount of the molten metal 25 flowing down from the crucible 15, increasing the pressure of the gas jet 26, and increasing the flow rate of the gas jet 26. By performing operations opposite to the operations, the particle diameter can be increased.

The particle size distribution of the amorphous alloy soft magnetic powder can be narrowed by, for example, setting the downflow amount of the molten metal 25, and the pressure and the flow rate of the gas jet 26 within the above ranges. With this setting, a ratio of the tap density to the apparent density of the amorphous alloy soft magnetic powder can be increased.

The produced amorphous alloy soft magnetic powder may be subjected to a heat treatment as necessary. As conditions in the heat treatment, for example, a heating temperature is set to 200° C. or higher and 500° C. or lower, and a holding time at the above temperature is set to 5 minutes or longer and 2 hours or shorter. Examples of a heat treatment atmosphere include an inert gas atmosphere such as nitrogen and argon, a reducing gas atmosphere such as hydrogen and ammonia decomposition gas, and reduced-pressure atmospheres thereof.

The amorphous alloy soft magnetic powder may be subjected to a classification treatment as necessary. Examples of a method of the classification treatment include dry classification such as sieving classification, inertial classification, centrifugal classification, and wind classification, and wet classification such as sedimentation classification.

An insulating film may be formed at surfaces of the particles of the obtained soft magnetic powder as necessary. A constituent material of the insulating film is not particularly limited. Examples thereof include inorganic materials such as phosphates such as magnesium phosphate, calcium phosphate, zinc phosphate, manganese phosphate, and cadmium phosphate, and silicates such as sodium silicate.

3. Dust Core and Magnetic Element

Next, a dust core and a magnetic element according to the embodiment will be described.

The magnetic element according to the embodiment can be applied to various magnetic elements including a magnetic core, such as a choke coil, an inductor, a noise filter, a reactor, a transformer, a motor, an actuator, an electromagnetic valve, and a generator. The dust core according to the embodiment can be applied to a magnetic core included in these magnetic elements.

Hereinafter, two types of coil components will be representatively described as examples of the magnetic element.

3.1. Toroidal Type

First, a toroidal type coil component serving as the magnetic element according to the embodiment will be described.

Figure 2:
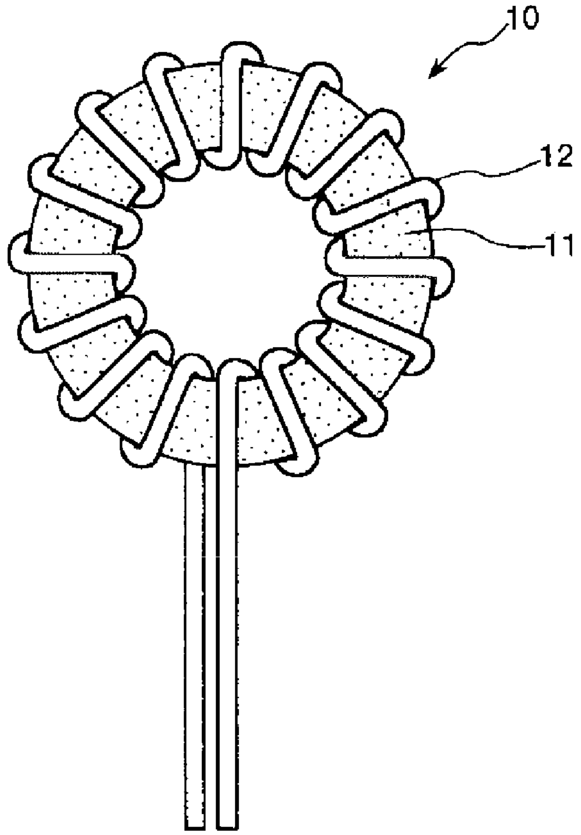
FIG. 2 is a plan view schematically showing a toroidal type coil component.

FIG. 2 is a plan view schematically showing the toroidal type coil component. A coil component 10 shown in FIG. 2 includes a ring-shaped dust core 11 and a conductive wire 12 wound around the dust core 11.

The dust core 11 is obtained by mixing the above-described amorphous alloy soft magnetic powder and a binder, supplying the obtained mixture to a mold, and pressing and molding the mixture. That is, the dust core 11 is a powder compact containing the amorphous alloy soft magnetic powder according to the embodiment. Such a dust core 11 has a high saturation magnetic flux density and a low coercive force. Therefore, when the coil component 10 including the dust core 11 is mounted on an electronic device or the like, power consumption of the electronic device can be reduced, a size of the electronic device can be reduced and an output thereof can be increased.

The coil component 10 includes such a dust core 11. Such a coil component 10 contributes to the reduction in size and the increase in the output of the electronic device.

Examples of a constituent material of the binder used in the production of the dust core 11 include organic materials such as silicone-based resins, epoxy-based resins, phenol-based resins, polyamide-based resins, polyimide-based resins, and polyphenylene sulfide-based resins, and inorganic materials such as phosphates such as magnesium phosphate, calcium phosphate, zinc phosphate, manganese phosphate, and cadmium phosphate, and silicates such as sodium silicate.

Examples of a constituent material of the conductive wire 12 include a material having high conductivity, for example, a metal material containing Cu, Al, Ag, Au, and Ni. An insulating film is provided on a surface of the conductive wire 12 as necessary.

A shape of the dust core 11 is not limited to the ring shape shown in FIG. 2, and may be, for example, a shape in which a part of the ring is missing, or a shape in which a shape in a longitudinal direction is linear.

The dust core 11 may contain a non-magnetic powder or a soft magnetic powder other than the amorphous alloy soft magnetic powder according to the embodiment described above as necessary.

3.2. Closed Magnetic Circuit Type

Next, a closed magnetic circuit type coil component serving as the magnetic element according to the embodiment will be described.

Figure 3:
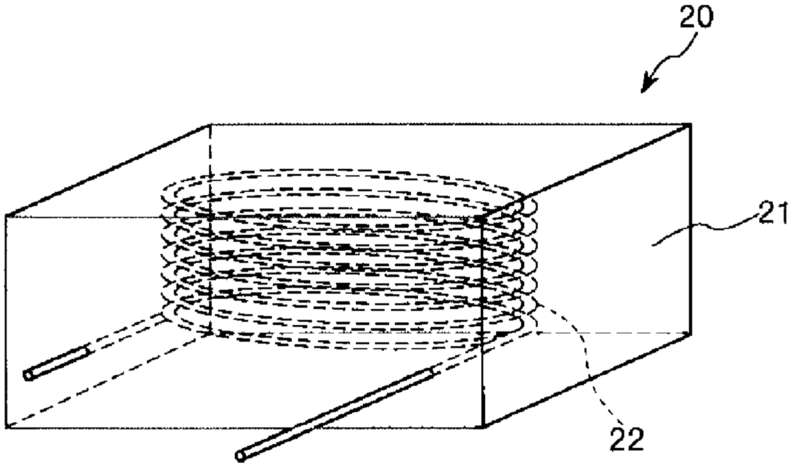
FIG. 3 is a transparent perspective view schematically showing a closed magnetic circuit type coil component.

FIG. 3 is a transparent perspective view schematically showing the closed magnetic circuit type coil component.

Hereinafter, the closed magnetic circuit type coil component will be described. In following description, differences from the toroidal type coil component will be mainly described, and description of similar matters is omitted.

A coil component 20 shown in FIG. 3 includes a chip-shaped dust core 21, and a conductive wire 22 embedded in the dust core 21 and formed into a coil shape. That is, the dust core 21 is a powder compact containing the amorphous alloy soft magnetic powder according to the embodiment. Such a dust core 21 has a high saturation magnetic flux density and a low coercive force.

The coil component 20 includes such a dust core 21. Such a coil component 20 contributes to the reduction in size and the increase in the output of the electronic device.

The dust core 21 may contain a non-magnetic powder or a soft magnetic powder other than the amorphous alloy soft magnetic powder according to the embodiment described above as necessary.

4. Electronic Device

Next, an electronic device including the magnetic element according to the embodiment will be described with reference to FIGS. 4 to 6.

Figure 4:
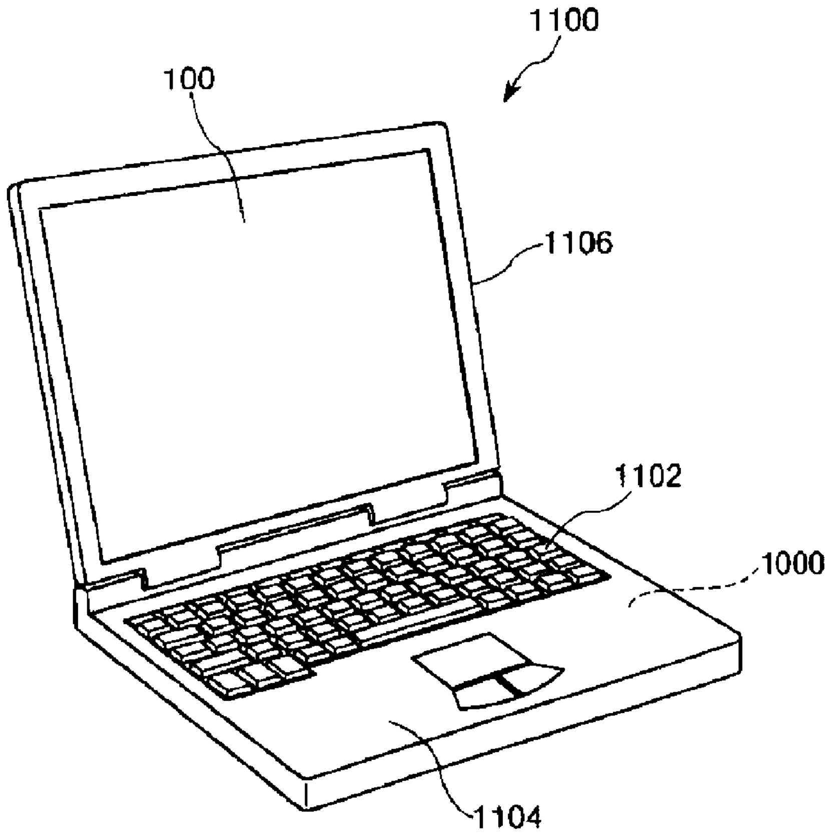
FIG. 4 is a perspective view showing a mobile personal computer which is an electronic device including a magnetic element according to an embodiment.

FIG. 4 is a perspective view showing a mobile personal computer which is an electronic device including the magnetic element according to the embodiment. A personal computer 1100 shown in FIG. 4 includes a main body 1104 including a keyboard 1102 and a display unit 1106 including a display 100. The display unit 1106 is pivotably supported by the main body 1104 via a hinge structure. Such a personal computer 1100 is incorporated with a magnetic element 1000 such as a choke coil for a switching power supply, an inductor, and a motor.

Figure 5:
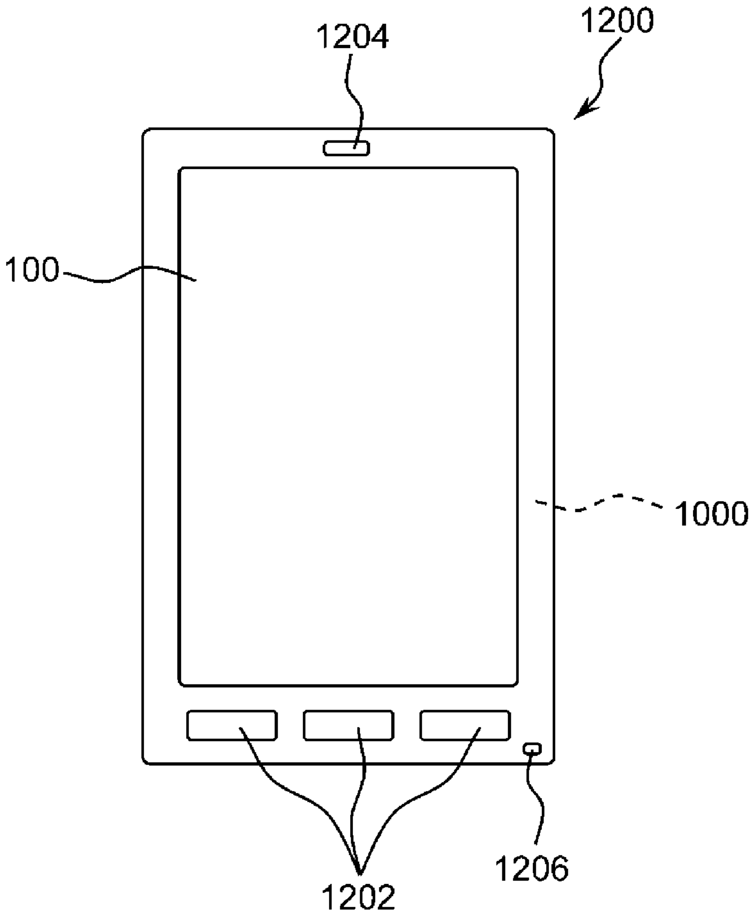
FIG. 5 is a plan view showing a smartphone which is an electronic device including the magnetic element according to the embodiment.

FIG. 5 is a plan view showing a smartphone which is an electronic device including the magnetic element according to the embodiment. A smartphone 1200 shown in FIG. 5 includes a plurality of operation buttons 1202, an earpiece 1204, and a mouthpiece 1206. The display 100 is disposed between the operation buttons 1202 and the earpiece 1204. Such a smartphone 1200 is incorporated with the magnetic element 1000 such as an inductor, a noise filter, and a motor.

Figure 6:
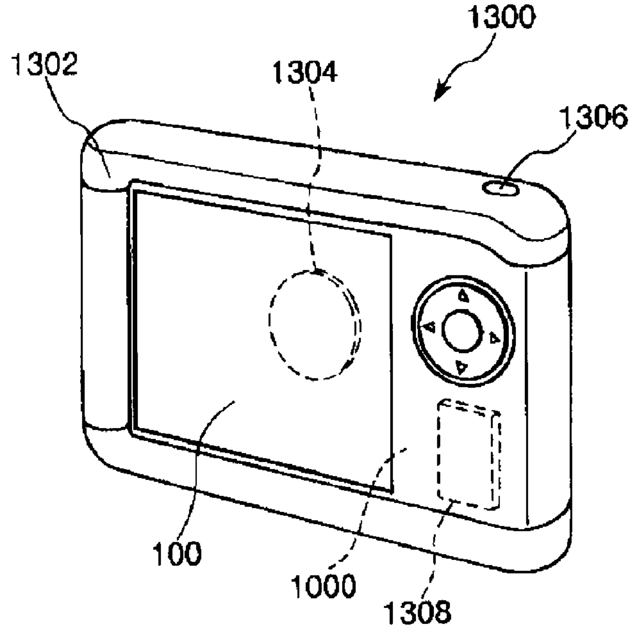
FIG. 6 is a perspective view showing a digital still camera which is an electronic device including the magnetic element according to the embodiment.

FIG. 6 is a perspective view showing a digital still camera which is an electronic device including the magnetic element according to the embodiment. A digital still camera 1300 photoelectrically converts an optical image of a subject by an imaging element such as a charge coupled device (CCD) to generate an imaging signal.

The digital still camera 1300 shown in FIG. 6 includes the display 100 provided on a rear surface of a case 1302. The display 100 functions as a finder that displays the subject as an electronic image. A light receiving unit 1304 including an optical lens, a CCD, and the like is provided on a front surface side of the case 1302, that is, on a back surface side in the drawing.

When a photographer confirms a subject image displayed on the display 100 and presses a shutter button 1306, an imaging signal of the CCD at that time is transferred to and stored in a memory 1308. Such a digital still camera 1300 is also incorporated with the magnetic element 1000 such as an inductor or a noise filter.

In addition to the personal computer shown in FIG. 4, the smartphone shown in FIG. 5, and the digital still camera shown in FIG. 6, examples of the electronic device according to the embodiment include a mobile phone, a tablet terminal, a watch, an inkjet dispensing apparatus such as an inkjet printer, a laptop personal computer, a television, a video camera, a video tape recorder, a car navigation apparatus, a pager, an electronic notebook, an electronic dictionary, a calculator, an electronic game device, a word processor, a workstation, a videophone, a crime prevention television monitor, electronic binoculars, a POS terminal, a medical device such as an electronic thermometer, a blood pressure meter, a blood glucose meter, an electrocardiogram measuring device, an ultrasonic diagnosis device, and an electronic endoscope, a fish finder, various measuring devices, instruments for a vehicle, an aircraft, and a ship, moving body control devices such as an automobile control device, an aircraft control device, a railway vehicle control device, and a ship control device, and a flight simulator.

As described above, such an electronic device includes the magnetic element according to the embodiment. Accordingly, effects of the magnetic element such as a low coercive force and a high saturation magnetic flux density can be exerted, and a size of the electronic device can be reduced and an output thereof can be increased.

As described above, the amorphous alloy soft magnetic powder, the dust core, the magnetic element, and the electronic device according to the present disclosure are described based on the preferred embodiment, and the present disclosure is not limited thereto.

For example, in the above embodiment, the dust core is described as a use example of the amorphous alloy soft magnetic powder according to the present disclosure, and the use example is not limited thereto. The amorphous alloy soft magnetic powder may be used for a magnetic device such as a magnetic fluid, a magnetic shielding sheet, or a magnetic head. The shapes of the dust core and the magnetic element are not limited to those shown in the drawings, and may be any shape.

EXAMPLES

Next, specific examples of the present disclosure will be described.

5. Production of Dust Core

5.1. Sample No. 1

First, raw materials were melted in a high-frequency induction furnace and pulverized by a rotary water atomization method to obtain an amorphous alloy soft magnetic powder. At this time, a downflow amount of a molten metal flowing down from a crucible was 10.0 kg/min, a pressure of gas jet was 10.0 MPa, a flow rate of the gas jet was 10.0 $Nm^3$/min, and a pressure of a coolant was 40 MPa.

Next, classification was performed by a classifier using a mesh having an opening of 150 μm. An alloy composition of the classified amorphous alloy soft magnetic powder is shown in Table 1. For specifying the alloy composition, a solid emission spectrometer manufactured by SPECTRO, model: SPECTROLAB, type: LAVMB08A was used.

Next, a particle size distribution of the obtained amorphous alloy soft magnetic powder was measured. The measurement was performed by using Microtrac HRA9320-X100, manufactured by Nikkiso Co., Ltd, i.e., a laser diffraction particle size distribution measurement apparatus. A degree of crystallization of the obtained amorphous alloy soft magnetic powder was measured by an X-ray diffractometer. Measurement results are shown in Table 1.

Next, the obtained amorphous alloy soft magnetic powder was heated at 360° C. for 15 minutes in a nitrogen atmosphere.

Next, the obtained amorphous alloy soft magnetic powder, an epoxy resin serving as a binder, and toluene serving as an organic solvent were mixed to obtain a mixture. An addition amount of the epoxy resin was 2 parts by mass with respect to 100 parts by mass of the amorphous alloy soft magnetic powder.

Next, the obtained mixture was stirred and then dried for a short time to obtain a massive dried body. Next, the dried body was sieved with a sieve having an opening of 400 μm, and the dried body was pulverized to obtain granulated powders. The obtained granulated powders were dried at 50° C. for 1 hour.

Next, a mold is filled with the obtained granulated powders, and a molded product was obtained based on the following molding conditions.

Molding Conditions

Molding method: press molding

Shape of molded product: ring shape

Dimensions of molded product: outer diameter 14 mm, inner diameter 8 mm, thickness 3 mm Molding pressure: 3 $t/cm^2$ (294 MPa)

Next, the molded product was heated in an air atmosphere at a temperature of 150° C. for 0.50 hour to cure the binder. Accordingly, a dust core was obtained.

5.2. Sample Nos. 2 to 16

Dust cores were obtained in the same manner as in Sample No. 1 except that the amorphous alloy soft magnetic powders shown in Table 1 were used.

TABLE 1

| Sample No. | Example/ Comparative Example | Atomization method | Cooling speed K/s | Alloy composition formula x — | y — | a — | b — | Alloy composition ratio Fe | Co | Si | B | M C | S | P | Sn | Mo | Cu | Nb | Total Atomic % |
|---|---|---|---|---|---|---|---|---|---|---|---|---|---|---|---|---|---|---|---|
| No. 1 | Example | Rotary water | $10^7$ | 0.74 | 0.06 | 16.00 | 0.00 | 62.2 | 21.8 | 1.0 | 15.0 | | | | | | | | 100 |
| No. 2 | Example | Rotary water | $10^7$ | 0.76 | 0.06 | 16.00 | 0.00 | 63.8 | 20.2 | 1.0 | 15.0 | | | | | | | | 100 |
| No. 3 | Example | Rotary water | $10^7$ | 0.79 | 0.06 | 16.00 | 0.00 | 66.4 | 17.6 | 1.0 | 15.0 | | | | | | | | 100 |
| No. 4 | Example | Rotary water | $10^7$ | 0.82 | 0.06 | 16.00 | 0.00 | 68.9 | 15.1 | 1.0 | 15.0 | | | | | | | | 100 |
| No. 5 | Example | Rotary water | $10^7$ | 0.84 | 0.06 | 16.00 | 0.00 | 70.6 | 13.4 | 1.0 | 15.0 | | | | | | | | 100 |
| No. 6 | Example | Rotary water | $10^7$ | 0.79 | 0.03 | 16.00 | 0.00 | 66.4 | 17.6 | 0.5 | 15.5 | | | | | | | | 100 |
| No. 7 | Example | Rotary water | $10^7$ | 0.79 | 0.05 | 16.00 | 0.00 | 66.4 | 17.6 | 0.8 | 15.2 | | | | | | | | 100 |
| No. 8 | Example | Rotary water | $10^7$ | 0.79 | 0.09 | 16.00 | 0.00 | 66.4 | 17.6 | 1.4 | 14.6 | | | | | | | | 100 |
| No. 9 | Example | Rotary water | $10^7$ | 0.79 | 0.06 | 14.00 | 0.00 | 67.9 | 18.1 | 0.8 | 13.2 | | | | | | | | 100 |
| No. 10 | Example | Rotary water | $10^7$ | 0.78 | 0.07 | 18.00 | 0.00 | 64.0 | 18.0 | 1.3 | 16.7 | | | | | | | | 100 |
| No. 11 | Comparative Example | Rotary water | $10^7$ | 0.71 | 0.06 | 16.00 | 0.00 | 59.6 | 24.4 | 1.0 | 15.0 | | | | | | | | 100 |
| No. 12 | Comparative Example | Rotary water | $10^7$ | 0.87 | 0.06 | 16.00 | 0.00 | 73.1 | 10.9 | 1.0 | 15.0 | | | | | | | | 100 |
| No. 13 | Comparative Example | Rotary water | $10^7$ | 0.79 | 0.01 | 16.00 | 0.00 | 66.4 | 17.6 | 0.2 | 15.8 | | | | | | | | 100 |
| No. 14 | Comparative Example | Rotary water | $10^7$ | 0.79 | 0.12 | 16.00 | 0.00 | 66.4 | 17.6 | 1.9 | 14.1 | | | | | | | | 100 |
| No. 15 | Comparative Example | Rotary water | $10^7$ | 0.80 | 0.05 | 10.00 | 0.00 | 72.0 | 18.0 | 0.5 | 9.5 | | | | | | | | 100 |
| No. 16 | Comparative Example | Rotary water | $10^7$ | 0.80 | 0.05 | 21.00 | 0.00 | 63.2 | 15.8 | 1.1 | 20.0 | | | | | | | | 100 |

5.3. Sample Nos. 17 to 29

Dust cores were obtained in the same manner as in Sample No. 1 except that the amorphous alloy soft magnetic powders shown in Table 2 were used.

5.4. Sample No. 30

An amorphous alloy soft magnetic powder was produced and a dust core was obtained in the same manner as in Sample No. 1 except that a water atomization method was used instead of the rotary water atomization method. A cooling speed by the water atomization method is as shown in Table 2.

5.5. Sample No. 31

A dust cores were obtained in the same manner as in Sample No. 30 except that the amorphous alloy soft magnetic powder shown in Table 2 was used.

TABLE 2

| Sample No. | Example/ Comparative Example | Atomization method | Cooling speed | Alloy composition formula x — | y — | a — | b — | Alloy composition ratio Fe | Co | Si | B | M C | S | P | Sn | Mo | Cu | Nb | Total Atomic % |
|---|---|---|---|---|---|---|---|---|---|---|---|---|---|---|---|---|---|---|---|
| No. 17 | Example | Rotary water | $10^7$ | 0.79 | 0.06 | 16.00 | 0.50 | 66.0 | 17.5 | 1.0 | 15.0 | 0.5 | | | | | | | 100 |
| No. 18 | Example | Rotary water | $10^7$ | 0.79 | 0.06 | 16.00 | 1.00 | 65.6 | 17.4 | 1.0 | 15.0 | 1.0 | | | | | | | 100 |
| No. 19 | Example | Rotary water | $10^7$ | 0.79 | 0.06 | 16.00 | 1.50 | 65.2 | 17.3 | 1.0 | 15.0 | 1.5 | | | | | | | 100 |
| No. 20 | Example | Rotary water | $10^7$ | 0.79 | 0.06 | 16.00 | 1.00 | 65.6 | 17.4 | 1.0 | 15.0 | | 1.0 | | | | | | 100 |
| No. 21 | Example | Rotary water | $10^7$ | 0.79 | 0.06 | 16.00 | 1.00 | 65.6 | 17.4 | 1.0 | 15.0 | | | 1.0 | | | | | 100 |
| No. 22 | Example | Rotary water | $10^7$ | 0.79 | 0.06 | 16.00 | 1.00 | 65.6 | 17.4 | 1.0 | 15.0 | | | | 1.0 | | | | 100 |
| No. 23 | Example | Rotary water | $10^7$ | 0.79 | 0.06 | 16.00 | 1.00 | 65.6 | 17.4 | 1.0 | 15.0 | | | | | 1.0 | | | 100 |

TABLE 2-continued

| | | | | Alloy composition formula | | | | Alloy composition ratio | | | | | | | | | | | |
|---|---|---|---|---|---|---|---|---|---|---|---|---|---|---|---|---|---|---|---|
| | | | | | | | | | | | | M | | | | | | | |
| Sample No. | Example/ Comparative Example | Atomization method | Cooling speed | x — | y — | a — | b — | Fe | Co | Si | B | C | S | P | Sn | Mo | Cu | Nb | Total |
| | | | | | | | | Atomic % | | | | | | | | | | | |
| No. 24 | Example | Rotary water | $10^7$ | 0.79 | 0.06 | 16.00 | 1.00 | 65.6 | 17.4 | 1.0 | 15.0 | | | | | | 1.0 | | 100 |
| No. 25 | Example | Rotary water | $10^7$ | 0.79 | 0.06 | 16.00 | 1.00 | 65.6 | 17.4 | 1.0 | 15.0 | | | | | | | 1.0 | 100 |
| No. 26 | Example | Rotary water | $10^7$ | 0.79 | 0.06 | 16.00 | 1.00 | 65.6 | 17.4 | 1.0 | 15.0 | 0.5 | 0.5 | | | | | | 100 |
| No. 27 | Example | Rotary water | $10^7$ | 0.79 | 0.06 | 16.00 | 1.00 | 65.6 | 17.4 | 1.0 | 15.0 | 0.5 | | 0.5 | | | | | 100 |
| No. 28 | Comparative Example | Rotary water | $10^7$ | 0.79 | 0.06 | 16.00 | 3.00 | 64.0 | 17.0 | 1.0 | 15.0 | 3.0 | | | | | | | 100 |
| No. 29 | Comparative Example | Rotary water | $10^7$ | 0.82 | 0.06 | 15.00 | 3.00 | 67.2 | 14.8 | 0.9 | 14.1 | 2.0 | 1.0 | | | | | | 100 |
| No. 30 | Comparative Example | Water | $10^6$ | 0.79 | 0.05 | 16.00 | 0.00 | 66.4 | 17.6 | 0.8 | 15.2 | | | | | | | | 100 |
| No. 31 | Comparative Example | Water | $10^5$ | 0.79 | 0.06 | 16.00 | 1.00 | 65.6 | 17.4 | 1.0 | 15.0 | 1.0 | | | | | | | 100 |

In Tables 1 and 2, among the amorphous alloy soft magnetic powders in the respective sample Nos., those corresponding to the present disclosure are shown as "Examples", and those not corresponding to the present disclosure are shown as "Comparative Examples".

6. Evaluation of Amorphous Alloy Soft Magnetic Powder and Dust Core

6.1. XAFS Measurement of Amorphous Alloy Soft Magnetic Powder

The XAFS measurement was performed on the amorphous alloy soft magnetic powders in Sample No. 3 (Example) and Sample No. 30 (Comparative Example) as representatives of the amorphous alloy soft magnetic powders obtained in the respective Examples and Comparative Examples. Measurement results are shown in FIGS. 7 to 16.

6.1.1. Si—K Absorption Edge XANES Spectra

Figure 7:
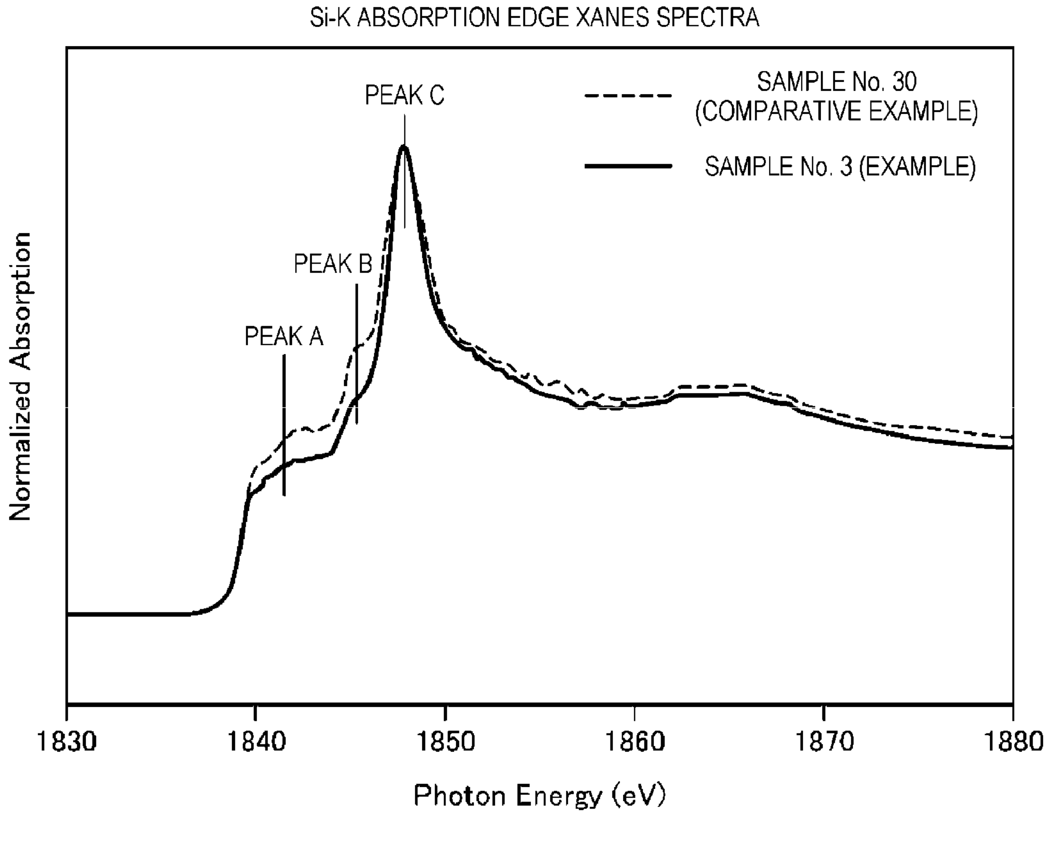
FIG. 7 shows Si—K absorption edge XANES spectra obtained for amorphous alloy soft magnetic powders in Sample No. 3 (Example) and Sample No. 30 (Comparative Example).
Figure 8:
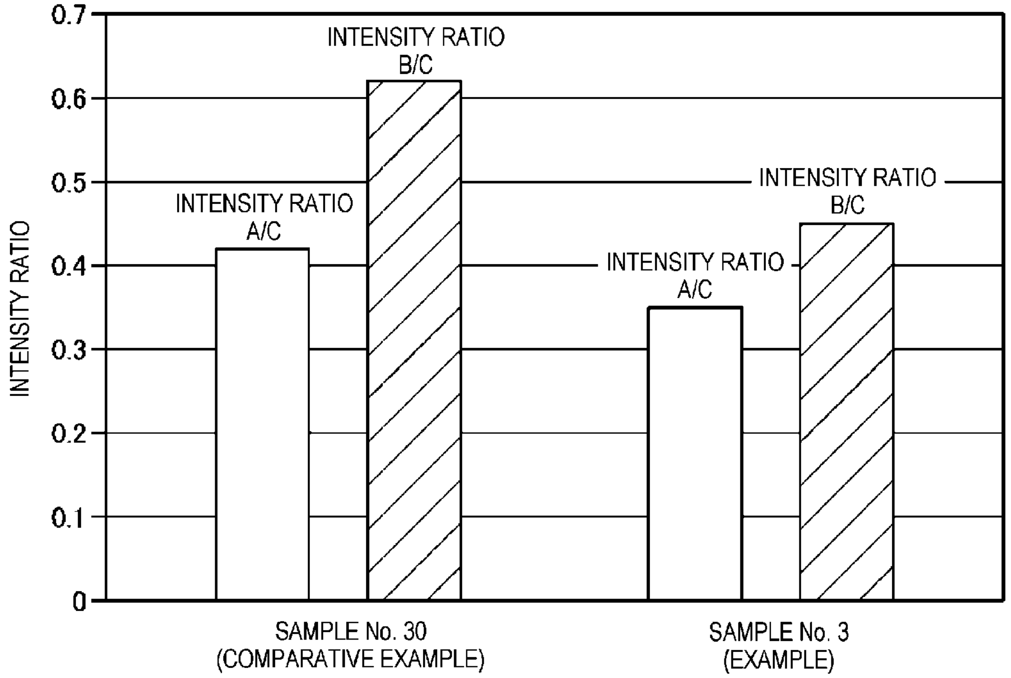
FIG. 8 is a graph comparing intensity ratios A/C and intensity ratios B/C obtained from the Si—K absorption edge XANES spectra shown in FIG. 7.

FIG. 7 shows Si—K absorption edge XANES spectra obtained for the amorphous alloy soft magnetic powders in Sample No. 3 (Example) and Sample No. 30 (Comparative Example). FIG. 8 is a graph comparing an intensity ratio A/C and an intensity ratio B/C obtained from the Si—K absorption edge XANES spectra shown in FIG. 7.

As shown in FIG. 7, a peak A and a peak B have a shoulder structure, and a peak C has an upwardly convex shape. Heights of the peaks were obtained, and the intensity ratio A/C and the intensity ratio B/C were calculated. The intensity ratio A/C and the intensity ratio B/C were similarly calculated for the amorphous alloy soft magnetic powders in other Examples and Comparative Examples. Calculation results are shown in Tables 3 and 4.

As shown in FIG. 8, in Sample No. 3 (Example), the intensity ratio A/C was 0.40 or less, and the intensity ratio B/C was 0.60 or less. On the other hand, in Sample No. 30 (Comparative Example), the intensity ratio A/C and the intensity ratio B/C were out of the above ranges.

Figure 9:
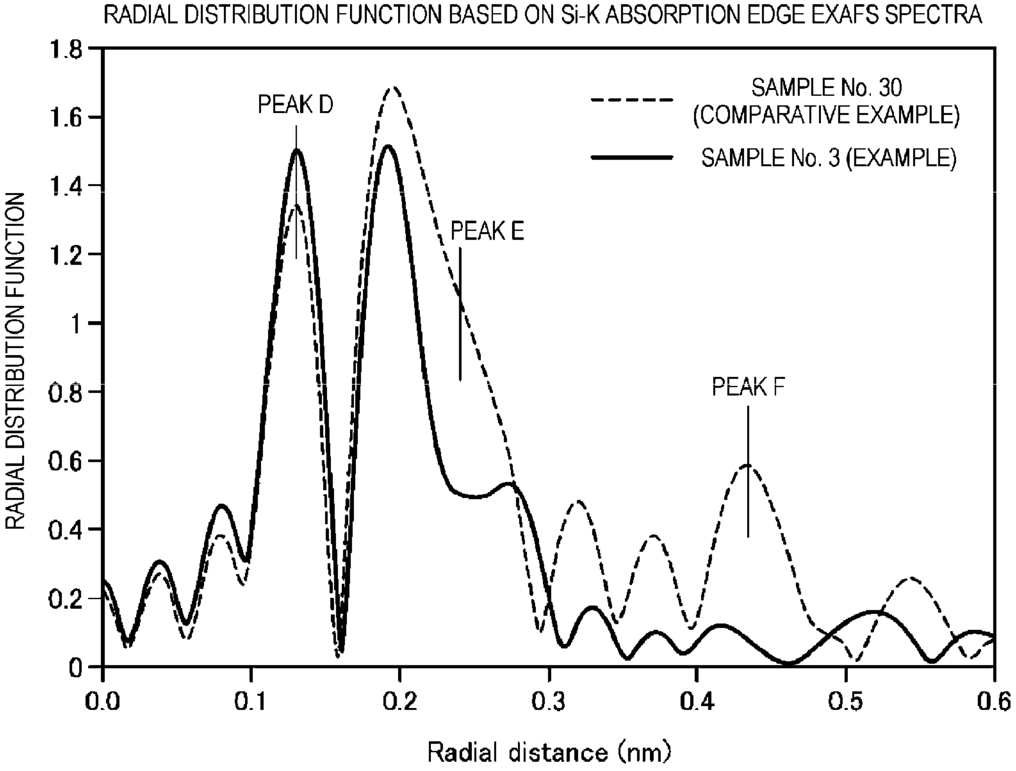
FIG. 9 shows a radial distribution function based on a Si—K absorption edge EXAFS spectra obtained for the amorphous alloy soft magnetic powders in Sample No. 3 (Example) and Sample No. 30 (Comparative Example).
Figure 10:
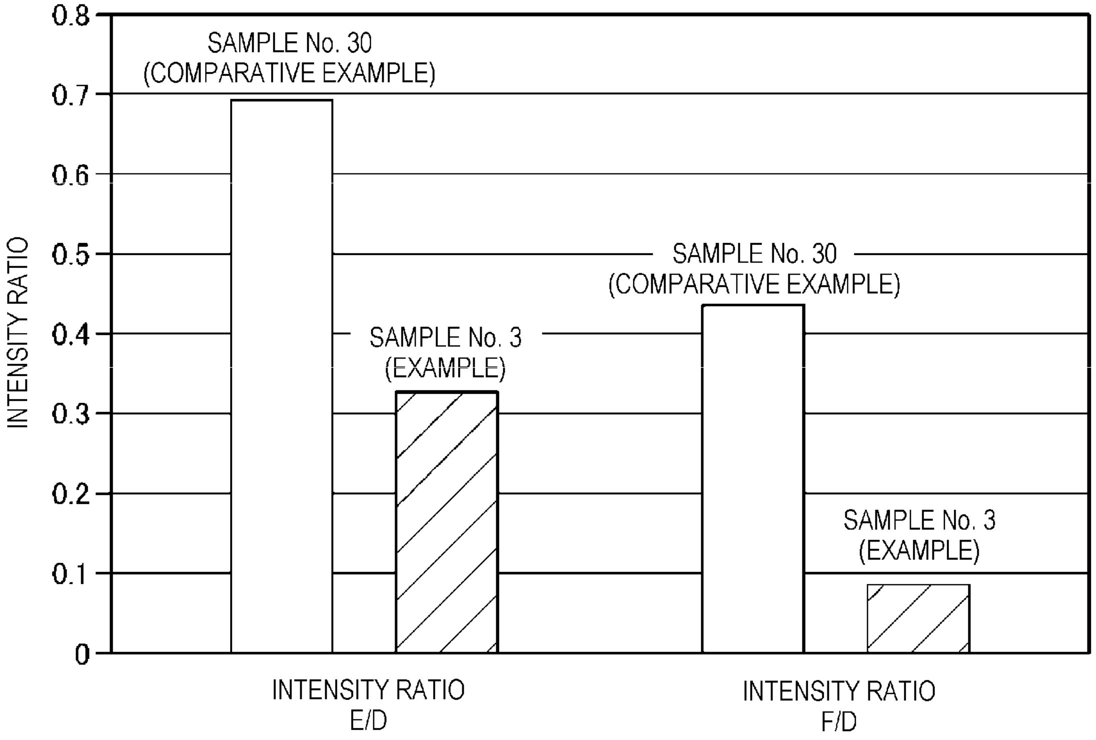
FIG. 10 is a graph comparing intensity ratios E/D and intensity ratios F/D obtained from the radial distribution function shown in FIG. 9.

6.1.2. Radial Distribution Function Based on Si—K Absorption Edge EXAFS Spectra FIG. 9 shows a radial distribution function based on Si—K absorption edge EXAFS spectra obtained for the amorphous alloy soft magnetic powders in Sample No. 3 (Example) and Sample No. 30 (Comparative Example). FIG. 10 is a graph comparing an intensity ratio E/D and an intensity ratio F/D obtained from the radial distribution function shown in FIG. 9.

As shown in FIG. 9, a peak D, a peak E, and a peak F were observed in the radial distribution function. Heights of the peaks were obtained, and the intensity ratio E/D and the intensity ratio F/D were calculated. The intensity ratio E/D and the intensity ratio F/D were similarly calculated for the amorphous alloy soft magnetic powders in other Examples and Comparative Examples. Calculation results are shown in Tables 3 and 4.

As shown in FIG. 10, in Sample No. 3 (Example), the intensity ratio E/D was 0.60 or less, and the intensity ratio F/D was 0.40 or less. On the other hand, in Sample No. 30 (Comparative Example), the intensity ratio E/D and the intensity ratio F/D were out of the above ranges.

Figure 11:
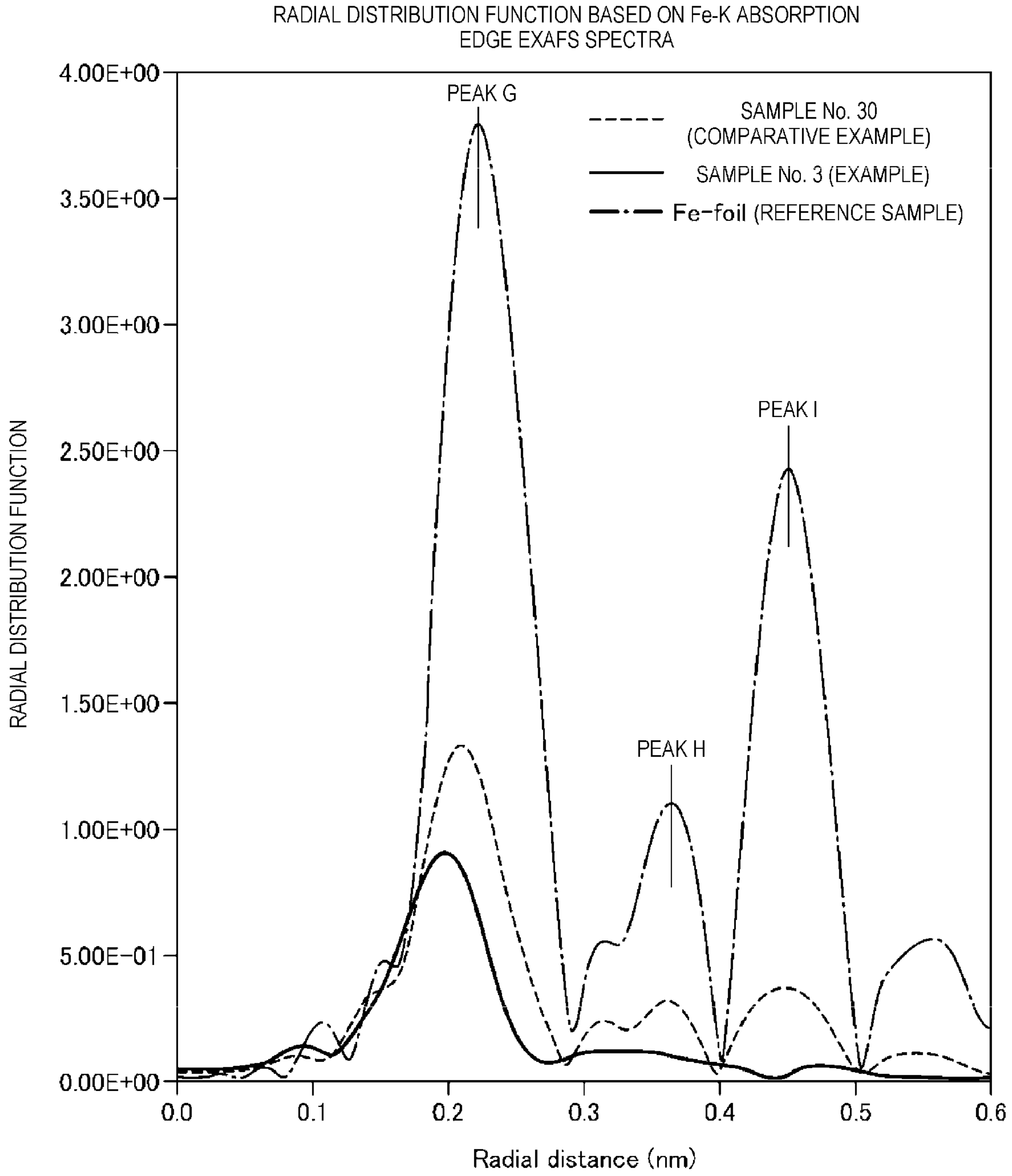
FIG. 11 shows a radial distribution function based on Fe—K absorption edge EXAFS spectra obtained for the amorphous alloy soft magnetic powders in Sample No. 3 (Example) and Sample No. 30 (Comparative Example).
Figure 12:
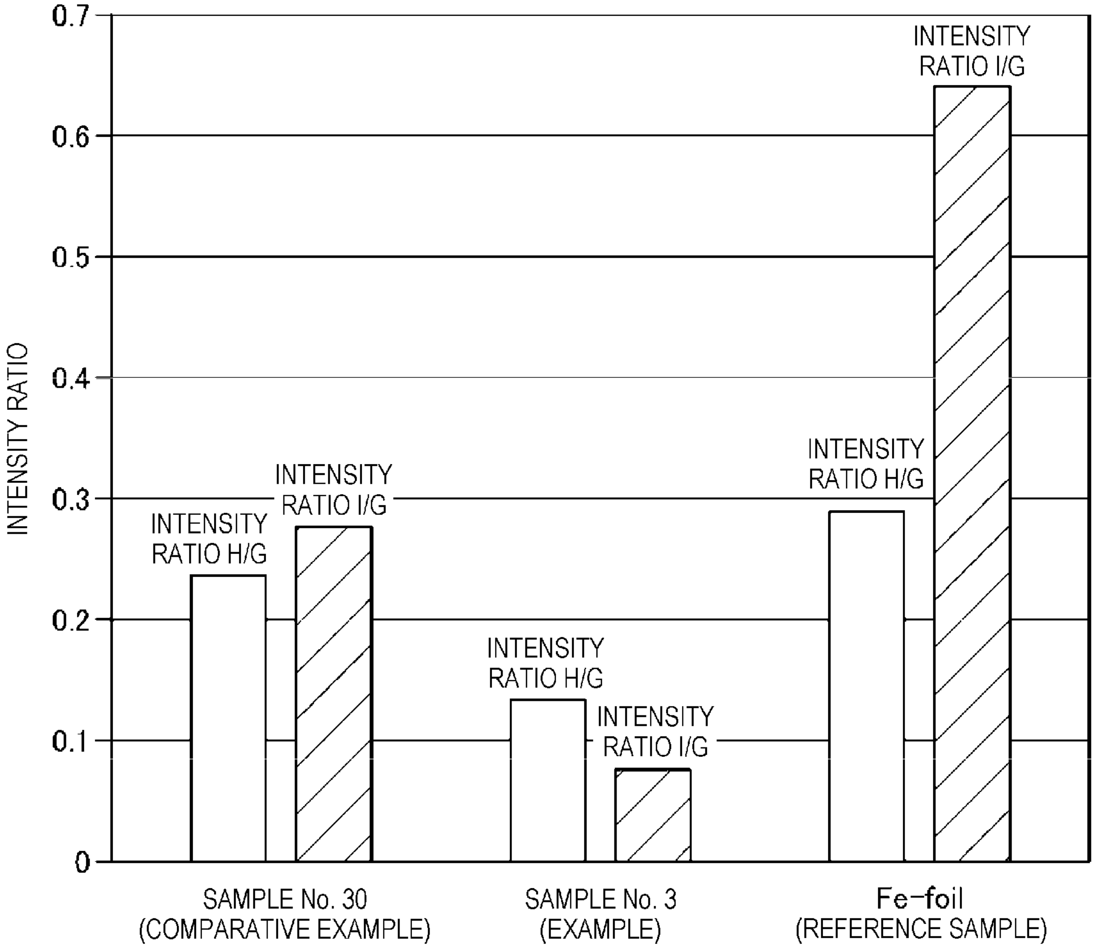
FIG. 12 is a graph comparing intensity ratios H/G and intensity ratios I/G obtained from the radial distribution function shown in FIG. 11.

6.1.3. Radial Distribution Function Based on Fe—K Absorption Edge EXAFS Spectra FIG. 11 shows a radial distribution function based on Fe—K absorption edge EXAFS spectra obtained for the amorphous alloy soft magnetic powders in Sample No. 3 (Example) and Sample No. 30 (Comparative Example). FIG. 12 is a graph comparing an intensity ratio H/G and an intensity ratio I/G obtained from the radial distribution function shown in FIG. 11. FIGS. 11 and 12 also show measurement results of Fe-foil as a reference sample.

As shown in FIG. 11, a peak G, a peak H, and a peak I were observed in the radial distribution function. A position of the peak G was within the range where an interatomic distance is 0.190 nm or more and 0.205 nm or less. Heights of the peaks were obtained, and the intensity ratio H/G and the intensity ratio I/G were calculated. The intensity ratio H/G and the intensity ratio I/G were similarly calculated for the amorphous alloy soft magnetic powders in other Examples and Comparative Examples. Calculation results are shown in Tables 3 and 4.

As shown in FIG. 12, in Sample No. 3 (Example), the intensity ratio H/G was 0.20 or less, and the intensity ratio I/G was 0.20 or less. On the other hand, in Sample No. 30 (Comparative Example) and Fe-foil, the intensity ratio H/G and the intensity ratio I/G were out of the above ranges.

6.1.4. Radial Distribution Function Based on Co—K Absorption Edge EXAFS Spectra (Surface)

Figure 13:
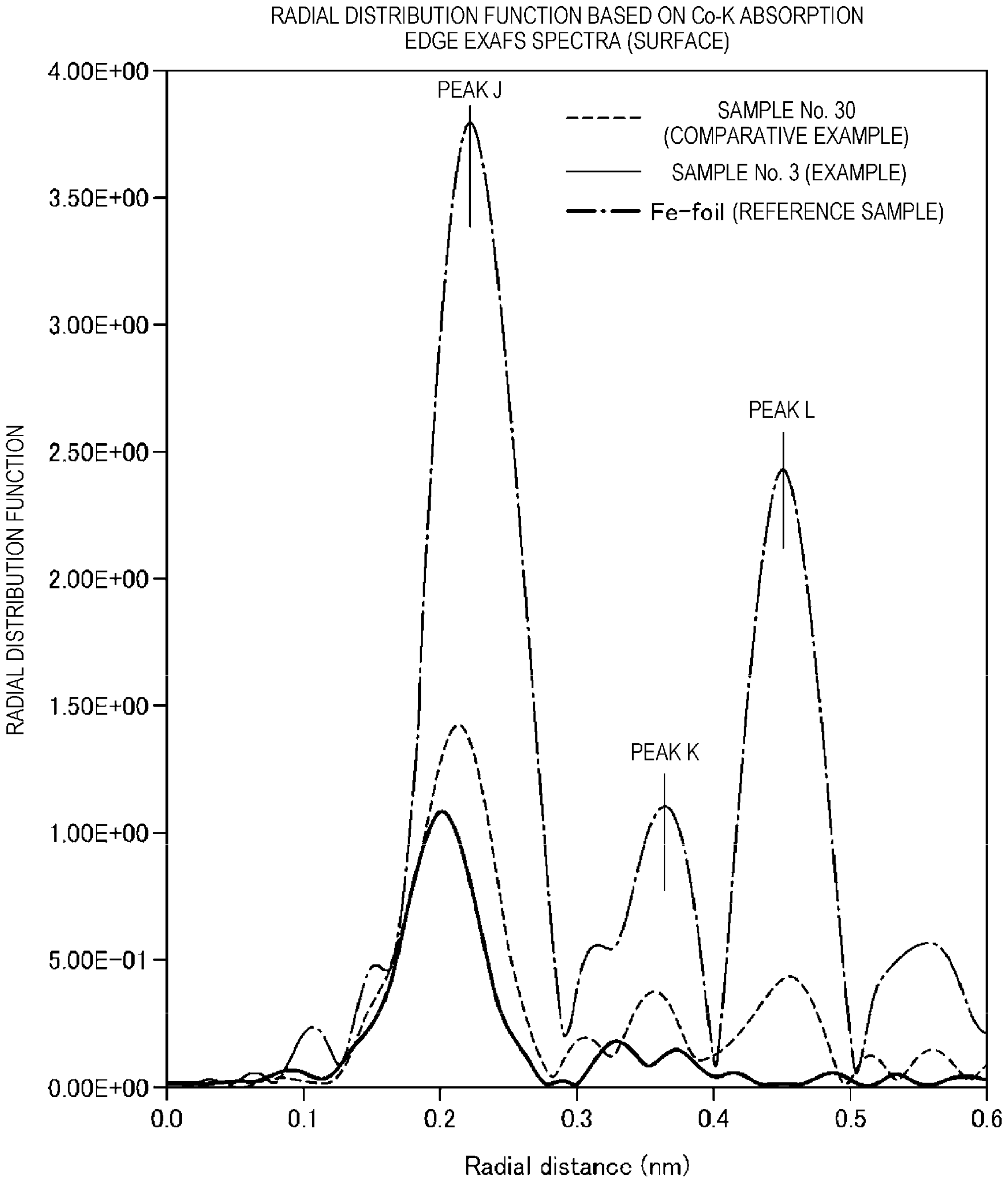
FIG. 13 shows a radial distribution function based on Co—K absorption edge EXAFS spectra obtained for surfaces of the amorphous alloy soft magnetic powders in Sample No. 3 (Example) and Sample No. 30 (Comparative Example).
Figure 14:
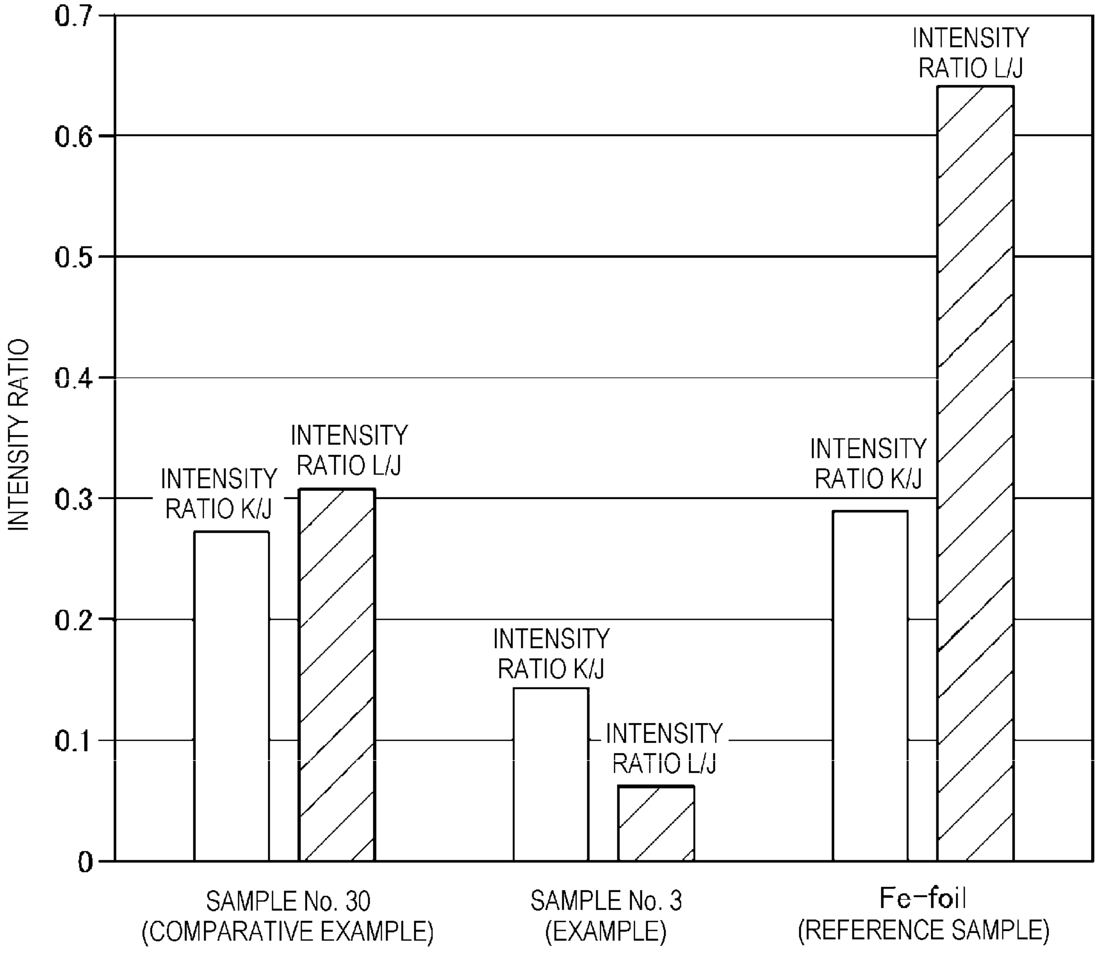
FIG. 14 is a graph comparing intensity ratios K/J and intensity ratios L/J obtained from the radial distribution function shown in FIG. 13.

FIG. 13 shows a radial distribution function based on Co—K absorption edge EXAFS spectra obtained for surfaces of the amorphous alloy soft magnetic powders in Sample No. 3 (Example) and Sample No. 30 (Comparative Example). FIG. 14 is a graph comparing an intensity ratio K/J and an intensity ratio L/J obtained from the radial distribution function shown in FIG. 13. FIGS. 13 and 14 also show measurement results of Fe-foil as a reference sample.

As shown in FIG. 13, a peak J, a peak K, and a peak L were observed in the radial distribution function. A position of the peak J was within the range where an interatomic distance is 0.190 nm or more and 0.205 nm or less. Heights of the peaks were obtained, and the intensity ratio K/J and the intensity ratio L/J were calculated. The intensity ratio K/J and the intensity ratio L/J were similarly calculated for the amorphous alloy soft magnetic powders in Examples and Comparative Examples except for a part thereof. Calculation results are shown in Tables 3 and 4.

As shown in FIG. 14, in Sample No. 3 (Example), the intensity ratio K/J was 0.20 or less, and the intensity ratio L/J was 0.20 or less. On the other hand, in Sample No. 30 (Comparative Example) and Fe-foil, the intensity ratio K/J and the intensity ratio L/J were out of the above ranges.

6.1.5. Radial Distribution Function Based on Co—K Absorption Edge EXAFS Spectra (Bulk)

Figure 15:
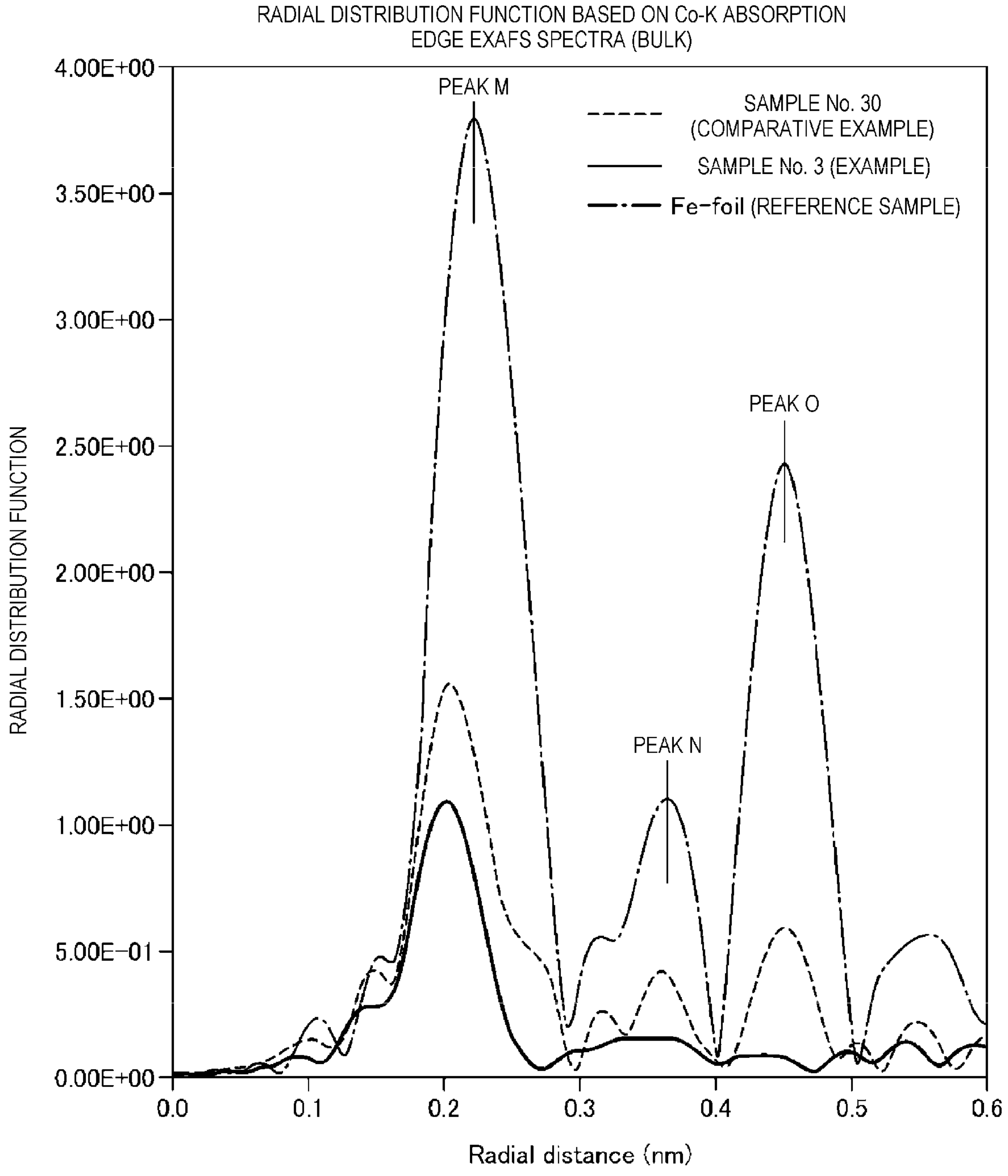
FIG. 15 shows a radial distribution function based on Co—K absorption edge EXAFS spectra obtained for bulks of the amorphous alloy soft magnetic powders in Sample No. 3 (Example) and Sample No. 30 (Comparative Example).
Figure 16:
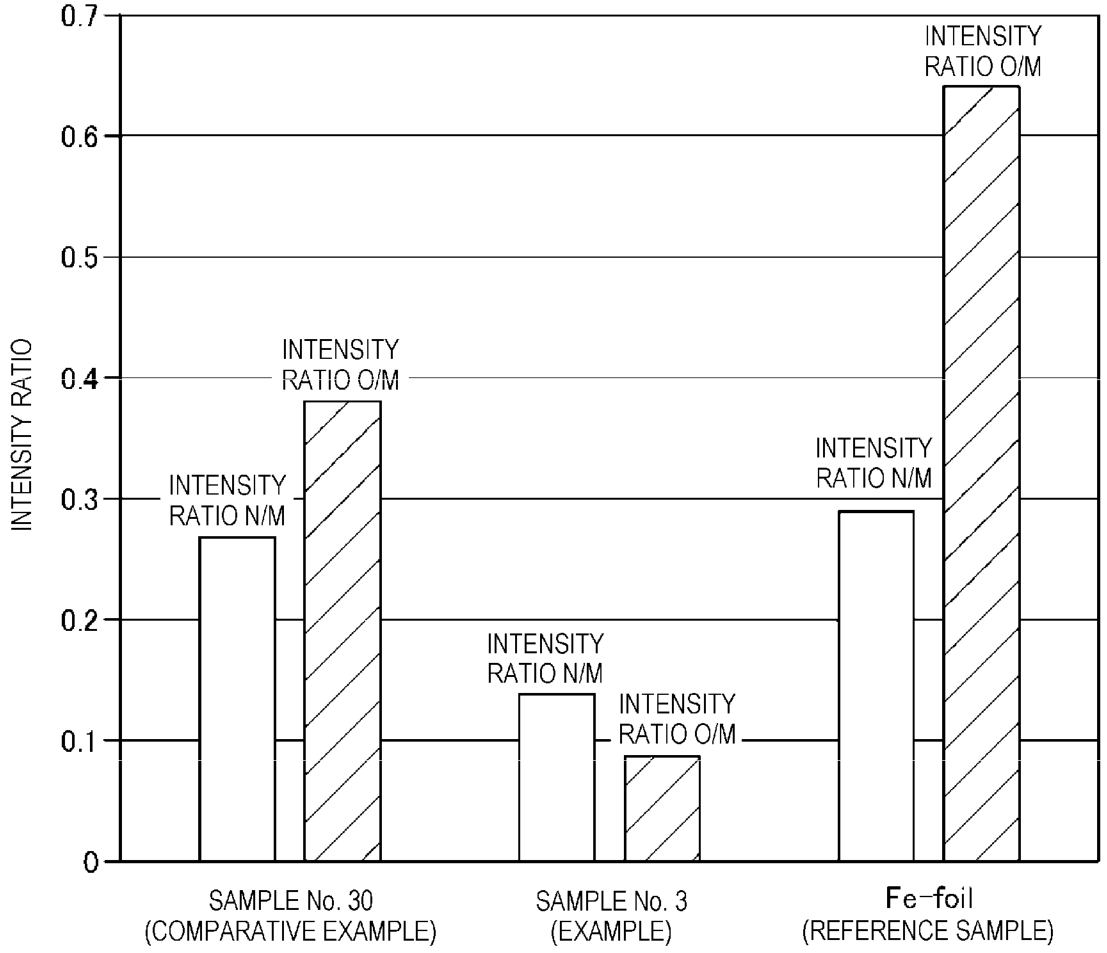
FIG. 16 is a graph comparing intensity ratios N/M and intensity ratios O/M obtained from the radial distribution function shown in FIG. 15.

FIG. 15 shows a radial distribution function based on Co—K absorption edge EXAFS spectra obtained for bulks of the amorphous alloy soft magnetic powders in Sample No. 3 (Example) and Sample No. 30 (Comparative Example). FIG. 16 is a graph comparing an intensity ratio N/M and an intensity ratio O/M obtained from the radial distribution function shown in FIG. 15. FIGS. 15 and 16 also show measurement results of Fe-foil as a reference sample.

As shown in FIG. 15, a peak M, a peak N, and a peak O were observed in the radial distribution function. A position of the peak M was within the range where an interatomic distance is 0.190 nm or more and 0.201 nm or less. Heights of the peaks were obtained, and the intensity ratio N/M and the intensity ratio O/M were calculated. The intensity ratio N/M and the intensity ratio O/M were similarly calculated for the amorphous alloy soft magnetic powders in Examples and Comparative Examples except for a part thereof. Calculation results are shown in Tables 3 and 4.

As shown in FIG. 16, in Sample No. 3 (Example), the intensity ratio N/M was 0.20 or less, and the intensity ratio O/M was 0.20 or less. On the other hand, in Sample No. 30 (Comparative Example) and Fe-foil, the intensity ratio N/M and the intensity ratio O/M were out of the above ranges.

TABLE 3

| | | Evaluation result of amorphous alloy soft magnetic powder by XAFS measurement | | | | | | | | | |
|---|---|---|---|---|---|---|---|---|---|---|---|
| Sample No. | Example/ Comparative Example | Intensity ratio A/C — | Intensity ratio B/C — | Intensity ratio E/D — | Intensity ratio F/D — | Intensity ratio H/G — | Intensity ratio I/G — | Intensity ratio K/J — | Intensity ratio L/J — | Intensity ratio N/M — | Intensity ratio O/M — |
| No. 1 | Example | 0.33 | 0.45 | 0.31 | 0.07 | 0.12 | 0.06 | | | | |
| No. 2 | Example | 0.35 | 0.46 | 0.35 | 0.09 | 0.14 | 0.08 | | | | |
| No. 3 | Example | 0.34 | 0.45 | 0.32 | 0.09 | 0.13 | 0.07 | 0.15 | 0.06 | 0.14 | 0.09 |
| No. 4 | Example | 0.34 | 0.46 | 0.31 | 0.08 | 0.13 | 0.07 | | | | |
| No. 5 | Example | 0.38 | 0.51 | 0.32 | 0.09 | 0.14 | 0.08 | | | | |
| No. 6 | Example | 0.39 | 0.58 | 0.38 | 0.10 | 0.16 | 0.10 | | | | |
| No. 7 | Example | 0.33 | 0.46 | 0.31 | 0.08 | 0.14 | 0.09 | 0.15 | 0.08 | 0.13 | 0.10 |
| No. 8 | Example | 0.35 | 0.45 | 0.35 | 0.09 | 0.13 | 0.09 | | | | |
| No. 9 | Example | 0.38 | 0.52 | 0.37 | 0.11 | 0.16 | 0.11 | | | | |
| No. 10 | Example | 0.39 | 0.53 | 0.38 | 0.12 | 0.17 | 0.12 | | | | |
| No. 11 | Comparative Example | 0.38 | 0.49 | 0.53 | 0.25 | 0.18 | 0.13 | | | | |
| No. 12 | Comparative Example | 0.43 | 0.58 | 0.55 | 0.38 | 0.23 | 0.18 | 0.22 | 0.15 | 0.21 | 0.19 |
| No. 13 | Comparative Example | 0.38 | 0.52 | 0.49 | 0.31 | 0.19 | 0.14 | | | | |
| No. 14 | Comparative Example | 0.37 | 0.48 | 0.51 | 0.35 | 0.18 | 0.14 | | | | |
| No. 15 | Comparative Example | 0.39 | 0.64 | 0.59 | 0.39 | 0.22 | 0.20 | 0.24 | 0.16 | 0.22 | 0.18 |
| No. 16 | Comparative Example | 0.40 | 0.53 | 0.54 | 0.37 | 0.17 | 0.12 | | | | |

TABLE 4

| Sample No. | Example/ Comparative Example | Evaluation result of amorphous alloy soft magnetic powder by XAFS measurement Intensity ratio A/C — | Intensity ratio B/C — | Intensity ratio E/D — | Intensity ratio F/D — | Intensity ratio H/G — | Intensity ratio I/G — | Intensity ratio K/J — | Intensity ratio L/J — | Intensity ratio N/M — | Intensity ratio O/M — |
|---|---|---|---|---|---|---|---|---|---|---|---|
| No. 17 | Example | 0.35 | 0.45 | 0.35 | 0.09 | 0.13 | 0.09 | | | | |
| No. 18 | Example | 0.33 | 0.42 | 0.31 | 0.08 | 0.12 | 0.07 | 0.14 | 0.06 | 0.13 | 0.08 |
| No. 19 | Example | 0.34 | 0.45 | 0.32 | 0.09 | 0.13 | 0.08 | | | | |
| No. 20 | Example | 0.35 | 0.46 | 0.31 | 0.08 | 0.13 | 0.08 | | | | |
| No. 21 | Example | 0.36 | 0.47 | 0.36 | 0.10 | 0.13 | 0.09 | | | | |
| No. 22 | Example | 0.35 | 0.47 | 0.35 | 0.09 | 0.14 | 0.08 | | | | |
| No. 23 | Example | 0.34 | 0.45 | 0.33 | 0.08 | 0.13 | 0.09 | | | | |
| No. 24 | Example | 0.35 | 0.45 | 0.34 | 0.09 | 0.14 | 0.09 | | | | |
| No. 25 | Example | 0.36 | 0.46 | 0.35 | 0.09 | 0.13 | 0.09 | | | | |
| No. 26 | Example | 0.32 | 0.41 | 0.31 | 0.07 | 0.11 | 0.07 | | | | |
| No. 27 | Example | 0.31 | 0.40 | 0.30 | 0.06 | 0.10 | 0.06 | | | | |
| No. 28 | Comparative Example | 0.44 | 0.66 | 0.60 | 0.44 | 0.21 | 0.26 | 0.24 | 0.25 | 0.23 | 0.31 |
| No. 29 | Comparative Example | 0.48 | 0.65 | 0.62 | 0.41 | 0.20 | 0.27 | 0.22 | 0.28 | 0.24 | 0.33 |
| No. 30 | Comparative Example | 0.42 | 0.62 | 0.69 | 0.43 | 0.24 | 0.28 | 0.28 | 0.31 | 0.27 | 0.38 |
| No. 31 | Comparative Example | 0.45 | 0.66 | 0.75 | 0.48 | 0.26 | 0.30 | 0.31 | 0.35 | 0.32 | 0.43 |

As is clear from Tables 3 and 4, it is found that the amorphous alloy soft magnetic powder in which the intensity ratio of the peaks of the XANES spectrum and the intensity ratio of the peaks of the radial distribution function are within predetermined ranges has a sufficiently low degree of crystallization (sufficiently high degree of amorphization). It is confirmed that such an amorphous alloy soft magnetic powder can be produced by a production method involving a high cooling speed.

6.2. Powder Characteristics of Amorphous Alloy Soft Magnetic Powder

An apparent density AD and a tap density TD of the amorphous alloy soft magnetic powder obtained in each of Examples and Comparative Examples were measured. A relative value of the tap density TD when the apparent density AD was set to 100, that is, a ratio of the tap density to the apparent density was calculated. Measurement results and calculation results are shown in Tables 5 and 6.

6.3. Coercive Force of Amorphous Alloy Soft Magnetic Powder

The coercive force of the amorphous alloy soft magnetic powder obtained in each of Examples and Comparative Examples was measured. Measurement results are shown in Tables 5 and 6.

6.4. Saturation Magnetic Flux Density of Amorphous Alloy Soft Magnetic Powder A maximum magnetization of the amorphous alloy soft magnetic powder obtained in each of Examples and Comparative Examples was measured, and then saturation magnetic flux densities were calculated based on the measurement result. Calculation results are shown in Tables 5 and 6.

6.5. Magnetic Permeability of Dust Core

The magnetic permeability of the dust core obtained in each of Examples and Comparative Examples was measured. Measurement results are shown in Tables 5 and 6.

TABLE 5

| Sample No. | Example/ Comparative Example | Evaluation result of power or dust core D50 μm | (D90 − D10)/D50 — | Degree of crystallization % | Apparent density g/cm³ | Ratio of tap density to apparent density — | Coercive force Oe | Saturation magnetic flux density T | Magnetic permeability (100 kHz) — |
|---|---|---|---|---|---|---|---|---|---|
| No. 1 | Example | 28.5 | 2.5 | 50 | 4.55 | 103 | 1.37 | 1.62 | 21.0 |
| No. 2 | Example | 31.0 | 2.4 | 60 | 4.60 | 109 | 1.35 | 1.63 | 21.5 |
| No. 3 | Example | 33.8 | 2.5 | 55 | 4.63 | 110 | 1.34 | 1.65 | 22.0 |
| No. 4 | Example | 35.4 | 2.6 | 55 | 4.61 | 108 | 1.37 | 1.63 | 21.3 |
| No. 5 | Example | 39.3 | 2.1 | 60 | 4.58 | 105 | 1.45 | 1.64 | 20.8 |
| No. 6 | Example | 32.3 | 2.4 | 70 | 4.57 | 107 | 1.40 | 1.63 | 20.1 |
| No. 7 | Example | 34.5 | 2.5 | 55 | 4.63 | 110 | 1.35 | 1.65 | 21.8 |
| No. 8 | Example | 25.4 | 2.7 | 60 | 4.56 | 107 | 1.36 | 1.63 | 21.7 |
| No. 9 | Example | 22.3 | 2.8 | 70 | 4.48 | 105 | 1.52 | 1.61 | 20.0 |
| No. 10 | Example | 17.8 | 3.1 | 70 | 4.47 | 105 | 1.48 | 1.60 | 20.1 |
| No. 11 | Comparative Example | 33.0 | 2.6 | 60 | 4.35 | 102 | 2.31 | 1.25 | 17.8 |

TABLE 5-continued

| Sample No. | Example/ Comparative Example | Evaluation result of power or dust core D50 µm | (D90 − D10)/D50 — | Degree of crystallization % | Apparent density g/cm$^3$ | Ratio of tap density to apparent density — | Coercive force Oe | Saturation magnetic flux density T | Magnetic permeability (100 kHz) — |
|---|---|---|---|---|---|---|---|---|---|
| No. 12 | Comparative Example | 40.0 | 2.2 | 80 | 4.34 | 102 | 3.50 | 1.08 | 18.0 |
| No. 13 | Comparative Example | 25.4 | 2.3 | 60 | 4.56 | 104 | 7.56 | 0.98 | 14.6 |
| No. 14 | Comparative Example | 21.3 | 3.0 | 60 | 4.45 | 106 | 5.42 | 1.54 | 19.5 |
| No. 15 | Comparative Example | 28.0 | 2.3 | 85 | 4.50 | 103 | 2.56 | 1.18 | 18.5 |
| No. 16 | Comparative Example | 34.2 | 2.3 | 70 | 4.43 | 102 | 3.65 | 1.07 | 16.5 |

TABLE 6

| Sample No. | Example/ Comparative Example | Evaluation result of power or dust core D50 Mm | (D90 − D10)/D50 — | Degree of crystallization % | Apparent density g/cm3 | Ratio of tap density to apparent density — | Coercive force Oe | Saturation magnetic flux density T | Magnetic permeability (100 kHz) — |
|---|---|---|---|---|---|---|---|---|---|
| No. 17 | Example | 35.2 | 2.5 | 60 | 4.64 | 110 | 1.33 | 1.66 | 22.8 |
| No. 18 | Example | 34.2 | 2.6 | 50 | 4.63 | 112 | 1.32 | 1.67 | 23.5 |
| No. 19 | Example | 33.5 | 2.6 | 55 | 4.65 | 108 | 1.34 | 1.66 | 23.1 |
| No. 20 | Example | 32.8 | 2.7 | 55 | 4.62 | 110 | 1.34 | 1.65 | 22.1 |
| No. 21 | Example | 28.5 | 2.7 | 60 | 4.61 | 108 | 1.35 | 1.65 | 22.0 |
| No. 22 | Example | 29.5 | 3.1 | 60 | 4.58 | 107 | 1.33 | 1.64 | 21.8 |
| No. 23 | Example | 30.5 | 3.1 | 55 | 4.56 | 107 | 1.34 | 1.65 | 21.7 |
| No. 24 | Example | 28.5 | 2.8 | 55 | 4.66 | 109 | 1.33 | 1.66 | 23.0 |
| No. 25 | Example | 27.4 | 2.6 | 55 | 4.63 | 108 | 1.34 | 1.66 | 23.0 |
| No. 26 | Example | 35.2 | 2.6 | 45 | 4.63 | 114 | 1.31 | 1.68 | 24.1 |
| No. 27 | Example | 33.4 | 3.2 | 45 | 4.66 | 114 | 1.31 | 1.68 | 24.2 |
| No. 28 | Comparative Example | 30.5 | 3.1 | 90 | 4.45 | 102 | 1.96 | 1.41 | 15.6 |
| No. 29 | Comparative Example | 28.5 | 3.2 | 95 | 4.36 | 102 | 2.04 | 1.36 | 14.6 |
| No. 30 | Comparative Example | 34.5 | 3.2 | 100 | 4.33 | 102 | 20.60 | 1.44 | 10.5 |
| No. 31 | Comparative Example | 33.6 | 2.8 | 100 | 4.35 | 106 | 18.50 | 1.36 | 11.6 |

As is clear from Tables 5 and 6, it is confirmed that the amorphous alloy soft magnetic powders obtained in the respective Examples achieve both a high saturation magnetic flux density and a low coercive force.

From the above, it is found that both the high saturation magnetic flux density and the low coercive force can be achieved in the amorphous alloy soft magnetic powder by optimizing the intensity ratio of the peaks included the XANES spectra.

Similarly, it is found that both the high saturation magnetic flux density and the low coercive force can be achieved in the amorphous alloy soft magnetic powder by optimizing the position and the intensity ratio of the peaks included the radial distribution function obtained from the EXAFS spectra.

What is claimed is:

1. An amorphous alloy soft magnetic powder comprising:

a composition represented by $(Fe_xCo_{1-x})_{100-(a+b)}(Si_yB_{1-y})_aS_b$, where x, y, a, and b satisfy 0.73≤x≤0.85, 0.02≤y≤0.10, 13.0≤a≤19.0, and 0.7≤b≤1, wherein an average particle diameter D50 of the amorphous alloy soft magnetic powder is 5.0 µm or more and 40.0 µm or less, wherein a content of Si is 0.50 atomic % or more and 1.40 atomic % or less, and wherein a Si—K absorption edge XANES spectrum obtained when performing an XAFS measurement on particles with an analysis depth set to a bulk has a peak A present in a range where an energy is 1842±1 eV, a peak B present in a range where the energy is 1845±1 eV, and a peak C present in a range where the energy is 1848±1 eV, and an intensity ratio A/C is 0.40 or less, and an intensity ratio B/C is 0.60 or less where A is an intensity of the peak A, B is an intensity of the peak B, and C is an intensity of the peak C.

2. The amorphous soft magnetic alloy powder according to claim 1, wherein a radial distribution function obtained by Fourier transform of a Si—K absorption edge EXAFS spectrum obtained by performing an XAFS measurement with an analysis depth set to a bulk has a peak D present in a range where an interatomic distance is 0.13±0.04 nm, a peak E present in a range where the interatomic distance is 0.24±0.04 nm, and a peak F present in a range where the interatomic distance is 0.43±0.04 nm, and an intensity ratio E/D is 0.60 or less, and an intensity ratio F/D is 0.40 or less where D is an intensity of the peak D, E is an intensity of the peak E, and F is an intensity of the peak F.

3. The amorphous soft magnetic alloy powder according to claim 1, wherein a radial distribution function obtained by Fourier transform of a Fe—K absorption edge EXAFS spectrum obtained by performing an XAFS measurement with an analysis depth set to a surface has a peak G present in a range where an interatomic distance is 0.22±0.04 nm, a peak H present in a range where the interatomic distance is 0.36±0.04 nm, and a peak I present in a range where the interatomic distance is 0.45±0.04 nm, and an intensity ratio H/G is 0.20 or less, and an intensity ratio I/G is 0.20 or less where G is an intensity of the peak G, H is an intensity of the peak H, and I is an intensity of the peak I.

4. The amorphous alloy soft magnetic powder according to claim 3, wherein the peak G is present in a range where the interatomic distance is 0.190 nm or more and 0.205 nm or less.

5. The amorphous soft magnetic alloy powder according to claim 1, wherein a radial distribution function obtained by Fourier transform of a Co—K absorption edge EXAFS spectrum obtained by performing an XAFS measurement with an analysis depth set to a surface has a peak J present in a range where an interatomic distance is 0.22±0.04 nm, a peak K present in a range where an interatomic distance is 0.35±0.04 nm, and a peak L present in a range where an interatomic distance is 0.44±0.04 nm, and an intensity ratio K/J is 0.20 or less, and an intensity ratio L/J is 0.20 or less where J is an intensity of the peak J, K is an intensity of the peak K, and L is an intensity of the peak L.

6. The amorphous alloy soft magnetic powder according to claim 5, wherein the peak J is present in a range where the interatomic distance is 0.190 nm or more and 0.205 nm or less.

7. The amorphous alloy soft magnetic powder according to claim 1, wherein a radial distribution function obtained by Fourier transform of a Co—K absorption edge EXAFS spectra obtained by performing an XAFS measurement with an analysis depth set to a bulk has a peak M present in a range where an interatomic distance is 0.190 nm or more and 0.201 nm or less.

8. A dust core comprising:

the amorphous alloy soft magnetic powder according to claim 1.

9. A magnetic element comprising:

the dust core according to claim 8.

10. An electronic device comprising:

the magnetic element according to claim 9.

* * * * *